(12) United States Patent
Zambetti et al.

(10) Patent No.: US 9,356,790 B2
(45) Date of Patent: May 31, 2016

(54) MULTI-USER INTEGRATED TASK LIST

(75) Inventors: Nicholas Zambetti, San Francisco, CA (US); Jesse Tane, San Francisco, CA (US); Katrin B. Gosling, Woodside, CA (US); Coe Leta Rayne Stafford, Millbrae, CA (US); Martin Nicholas John Heaton, San Francisco, CA (US); Matthew Robert Adams, Mountain View, CA (US); Peter Riering-Czekalla, Oakland, CA (US); Andrew Paul Switky, Menlo Park, CA (US); Michael Gibson, Evergreen, CO (US); Richard Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 490 days.

(21) Appl. No.: 12/981,991

(22) Filed: Dec. 30, 2010

(65) Prior Publication Data

US 2011/0276896 A1 Nov. 10, 2011

Related U.S. Application Data

(60) Provisional application No. 61/331,318, filed on May 4, 2010.

(51) Int. Cl.
*G06F 3/01* (2006.01)
*H04L 12/18* (2006.01)

(52) U.S. Cl.
CPC .................................. *H04L 12/1813* (2013.01)

(58) Field of Classification Search
CPC ... G06Q 10/10; G06Q 10/109; G06Q 10/107; G06F 3/0481; H04L 12/1822

USPC ......................................................... 715/751
See application file for complete search history.

(56) References Cited

U.S. PATENT DOCUMENTS 5,444,477 A  8/1995 Yamadera et al.
5,577,915 A * 11/1996 Feldman ....................... 434/238
(Continued)

FOREIGN PATENT DOCUMENTS

EP  1659794       5/2006
EP  2567304 A1   3/2013
(Continued)

OTHER PUBLICATIONS

RoundTolt  (http://www.joeisanerd.com/apps/roundtoithelp/helpcontents.html, dated Jan. 12, 2010; http://www.didigetthingsdone.com/2009/01/19/round-toit-iphone-app-review/, dated Jan. 19, 2009, and http://www.joeisanerd.com/apps/roundtoithelp/credits.html, last accessed Apr. 19, 2014.*

(Continued)

*Primary Examiner* — Jung-Mu Chuang
(74) *Attorney, Agent, or Firm* — Swanson & Bratschun, L.L.C.

(57) ABSTRACT

Solutions for providing integrated task list functionality. Some such solutions use a user supersystem as a communications hub to generate, display, and/or handle user-based tasks for a family group. For example, tasks may be assigned to one or more members of the family and associated with various types of dates, rewards, audits, etc. Family members may then interact with the tasks through the communications hub and/or through other devices (e.g., cell phones, etc.).

20 Claims, 14 Drawing Sheets

(56) References Cited

U.S. PATENT DOCUMENTS

| | | | |
|---|---|---|---|
| 5,862,322 A * | 1/1999 | Anglin et al. | 714/57 |
| 5,946,669 A * | 8/1999 | Polk | 705/40 |
| 6,052,442 A | 4/2000 | Cooper et al. | |
| 6,119,107 A * | 9/2000 | Polk | 705/40 |
| 6,434,604 B1 | 8/2002 | Harada et al. | |
| 6,473,631 B1 | 10/2002 | Siddoway et al. | |
| 6,834,195 B2 | 12/2004 | Brandenberg et al. | 455/456.3 |
| 6,968,362 B2 | 11/2005 | Koch et al. | |
| 6,993,596 B2 * | 1/2006 | Hinton et al. | 709/250 |
| 7,159,178 B2 * | 1/2007 | Vogt et al. | 715/733 |
| 7,185,054 B1 | 2/2007 | Ludwig et al. | |
| 7,302,436 B2 * | 11/2007 | Qubti | G06Q 10/06 |
| 7,343,561 B1 | 3/2008 | Stochosky et al. | |
| 7,451,389 B2 * | 11/2008 | Huynh et al. | 715/230 |
| 7,593,992 B2 * | 9/2009 | Wodtke et al. | 709/206 |
| 7,669,134 B1 | 2/2010 | Christie et al. | |
| 7,673,327 B1 | 3/2010 | Polis et al. | |
| 7,721,224 B2 | 5/2010 | Sellen et al. | |
| 7,777,783 B1 | 8/2010 | Chin et al. | |
| 7,881,957 B1 * | 2/2011 | Cohen et al. | |
| 7,882,433 B2 * | 2/2011 | Callaway et al. | 715/700 |
| 7,933,952 B2 * | 4/2011 | Parker et al. | 709/204 |
| 7,945,469 B2 * | 5/2011 | Cohen et al. | 705/7.14 |
| 7,957,326 B1 | 6/2011 | Christie, IV | |
| 7,970,649 B2 * | 6/2011 | Wu | 705/14.53 |
| 8,019,875 B1 | 9/2011 | Nielsen | |
| 8,027,861 B2 * | 9/2011 | Brintle | G06Q 10/06 705/7.13 |
| 8,037,021 B2 * | 10/2011 | Adler et al. | 707/610 |
| 8,037,041 B2 * | 10/2011 | Gupta | 707/705 |
| 8,037,070 B2 | 10/2011 | Maghoul | |
| 8,082,308 B1 * | 12/2011 | Filev | 709/206 |
| 8,185,897 B2 * | 5/2012 | Kushwaha | 718/100 |
| 8,219,920 B2 * | 7/2012 | Langoulant et al. | 715/752 |
| 8,255,258 B1 * | 8/2012 | Cohen et al. | 705/7.21 |
| 8,271,591 B2 * | 9/2012 | Malik et al. | 709/206 |
| 8,285,195 B2 * | 10/2012 | Etuk | G06Q 20/06 434/322 |
| 8,289,158 B2 * | 10/2012 | Bocking et al. | 340/539.18 |
| 8,302,015 B2 * | 10/2012 | Krishnan et al. | 715/747 |
| 8,306,507 B2 * | 11/2012 | Kim et al. | 455/412.2 |
| 8,321,704 B2 * | 11/2012 | Clarke et al. | 713/320 |
| 8,330,773 B2 | 12/2012 | Nielsen et al. | |
| 8,335,989 B2 * | 12/2012 | Barraclough et al. | 715/764 |
| 8,360,858 B2 * | 1/2013 | LaRocca et al. | 463/25 |
| 8,516,062 B2 * | 8/2013 | Killoran et al. | 709/206 |
| 8,532,630 B2 | 9/2013 | Mottes | |
| 8,549,520 B2 * | 10/2013 | Stoitsev et al. | 718/100 |
| 8,566,145 B2 * | 10/2013 | Dollens | 705/7.38 |
| 8,819,566 B2 | 8/2014 | Mehin et al. | |
| 8,942,367 B1 * | 1/2015 | Croak | H04M 3/548 379/211.02 |
| 2001/0001083 A1 | 5/2001 | Helot | |
| 2001/0047290 A1 * | 11/2001 | Petras et al. | 705/10 |
| 2002/0007309 A1 * | 1/2002 | Reynar | 705/14 |
| 2002/0016734 A1 | 2/2002 | McGill et al. | |
| 2002/0029304 A1 * | 3/2002 | Reynar et al. | 709/332 |
| 2002/0035581 A1 * | 3/2002 | Reynar et al. | 707/513 |
| 2002/0059376 A1 * | 5/2002 | Schwartz | 709/204 |
| 2002/0080180 A1 | 6/2002 | Mander et al. | |
| 2002/0087591 A1 * | 7/2002 | Reynar et al. | 707/500 |
| 2002/0099654 A1 * | 7/2002 | Nair | 705/40 |
| 2002/0111824 A1 * | 8/2002 | Grainger | 705/1 |
| 2002/0116363 A1 * | 8/2002 | Grainger | 707/1 |
| 2002/0120932 A1 | 8/2002 | Schwalb | |
| 2002/0123936 A1 * | 9/2002 | Hansen et al. | 705/26 |
| 2002/0143564 A1 * | 10/2002 | Webb et al. | 705/1 |
| 2002/0147717 A1 * | 10/2002 | Barros et al. | 707/7 |
| 2002/0160806 A1 | 10/2002 | Arazi et al. | |
| 2002/0161733 A1 * | 10/2002 | Grainger | 706/45 |
| 2003/0059024 A1 | 3/2003 | Meyerson et al. | |
| 2003/0113100 A1 | 6/2003 | Hecht et al. | |
| 2003/0120711 A1 * | 6/2003 | Katz | 709/106 |
| 2003/0129569 A1 * | 7/2003 | Callaway et al. | 434/108 |
| 2003/0163525 A1 | 8/2003 | Hendriks et al. | |
| 2003/0195976 A1 | 10/2003 | Shiigi | |
| 2003/0220972 A1 | 11/2003 | Montet et al. | |
| 2004/0010464 A1 | 1/2004 | Boaz | |
| 2004/0078776 A1 * | 4/2004 | Moon et al. | 717/101 |
| 2004/0119814 A1 | 6/2004 | Clisham et al. | |
| 2004/0133440 A1 * | 7/2004 | Carolan et al. | 705/1 |
| 2004/0172279 A1 * | 9/2004 | Carolan et al. | 705/1 |
| 2004/0228531 A1 | 11/2004 | Fernandez et al. | |
| 2004/0230599 A1 | 11/2004 | Moore et al. | |
| 2005/0026649 A1 * | 2/2005 | Zicker | G11B 23/0316 455/552.1 |
| 2005/0032527 A1 | 2/2005 | Sheha et al. | |
| 2005/0076049 A1 * | 4/2005 | Qubti | G06Q 10/06 |
| 2005/0096034 A1 | 5/2005 | Petermann | |
| 2005/0108091 A1 | 5/2005 | Sotak et al. | |
| 2005/0197999 A1 * | 9/2005 | Kumar | 707/1 |
| 2005/0216568 A1 | 9/2005 | Walkush et al. | |
| 2005/0221845 A1 | 10/2005 | Benco et al. | |
| 2005/0232247 A1 | 10/2005 | Whitley et al. | |
| 2005/0234981 A1 | 10/2005 | Manousos et al. | |
| 2005/0246216 A1 * | 11/2005 | Rosen et al. | 705/8 |
| 2005/0283742 A1 | 12/2005 | Gusmorino et al. | |
| 2006/0030370 A1 | 2/2006 | Wardimon | |
| 2006/0031291 A1 | 2/2006 | Beckemeyer | |
| 2006/0036766 A1 | 2/2006 | Baupin et al. | |
| 2006/0038794 A1 | 2/2006 | Shneidman | |
| 2006/0053380 A1 | 3/2006 | Spataro et al. | |
| 2006/0095417 A1 * | 5/2006 | Chender et al. | 707/3 |
| 2006/0106675 A1 * | 5/2006 | Cohen et al. | 705/26 |
| 2006/0123360 A1 | 6/2006 | Anwar et al. | |
| 2006/0128364 A1 | 6/2006 | Costa-Requena et al. | |
| 2006/0143157 A1 * | 6/2006 | Landsman | G06F 17/2705 |
| 2006/0159099 A1 | 7/2006 | Hensley | |
| 2006/0230128 A1 | 10/2006 | Chung et al. | |
| 2006/0236349 A1 | 10/2006 | Lee | |
| 2006/0282863 A1 | 12/2006 | Bushmitch et al. | |
| 2006/0291506 A1 | 12/2006 | Cain | |
| 2007/0030824 A1 | 2/2007 | Ribaudo et al. | |
| 2007/0040891 A1 | 2/2007 | Calloway | |
| 2007/0058647 A1 | 3/2007 | Bettis et al. | |
| 2007/0081636 A1 | 4/2007 | Shaffer et al. | |
| 2007/0124161 A1 * | 5/2007 | Mueller et al. | 705/1 |
| 2007/0152979 A1 | 7/2007 | Jobs et al. | |
| 2007/0186186 A1 | 8/2007 | Both et al. | |
| 2007/0203979 A1 | 8/2007 | Walker et al. | |
| 2007/0206086 A1 | 9/2007 | Baron et al. | |
| 2007/0207844 A1 * | 9/2007 | Pottinger et al. | 463/9 |
| 2007/0233377 A1 | 10/2007 | Salay et al. | |
| 2007/0250784 A1 * | 10/2007 | Riley et al. | 715/764 |
| 2007/0263828 A1 | 11/2007 | Lee et al. | |
| 2007/0277110 A1 | 11/2007 | Rogers et al. | |
| 2007/0282658 A1 * | 12/2007 | Brintle | G06Q 10/06 705/7.15 |
| 2007/0297426 A1 | 12/2007 | Haveson et al. | |
| 2008/0004002 A1 | 1/2008 | Chin et al. | |
| 2008/0005168 A1 * | 1/2008 | Huff et al. | 707/104.1 |
| 2008/0058010 A1 | 3/2008 | Lee | |
| 2008/0059305 A1 * | 3/2008 | Etuk | G06Q 20/06 705/14.27 |
| 2008/0065726 A1 | 3/2008 | Schoenberg | |
| 2008/0068447 A1 | 3/2008 | Mattila et al. | |
| 2008/0081580 A1 | 4/2008 | Cole | |
| 2008/0091782 A1 * | 4/2008 | Jakobson | 709/206 |
| 2008/0107100 A1 | 5/2008 | Begeja et al. | |
| 2008/0132252 A1 | 6/2008 | Altman et al. | |
| 2008/0140785 A1 | 6/2008 | Farrenkopf et al. | |
| 2008/0141247 A1 | 6/2008 | Saravanan | |
| 2008/0144611 A1 | 6/2008 | Huang et al. | |
| 2008/0152097 A1 | 6/2008 | Kent | |
| 2008/0153459 A1 | 6/2008 | Kansal et al. | |
| 2008/0155547 A1 * | 6/2008 | Weber et al. | 718/102 |
| 2008/0159262 A1 | 7/2008 | Crable et al. | |
| 2008/0174570 A1 | 7/2008 | Jobs et al. | |
| 2008/0178105 A1 * | 7/2008 | Loewenstein | 715/764 |
| 2008/0183744 A1 * | 7/2008 | Adendorff et al. | 707/102 |
| 2008/0192732 A1 | 8/2008 | Riley et al. | |
| 2008/0201143 A1 | 8/2008 | Olligschlaeger et al. | |
| 2008/0201438 A1 | 8/2008 | Mandre | |
| 2008/0221964 A1 * | 9/2008 | Berkovitz et al. | 705/9 |

(56) References Cited

U.S. PATENT DOCUMENTS

| | | |
|---|---|---|
| 2008/0231545 A1 | 9/2008 | Gong |
| 2008/0235121 A1* | 9/2008 | Gonen .......................... 705/35 |
| 2008/0240379 A1 | 10/2008 | Maislos et al. |
| 2008/0244582 A1* | 10/2008 | Brown et al. ................ 718/100 |
| 2008/0260347 A1 | 10/2008 | Widdowson |
| 2008/0261569 A1 | 10/2008 | Britt et al. |
| 2008/0270240 A1* | 10/2008 | Chu ................ G06Q 10/06375 705/14.11 |
| 2008/0275701 A1 | 11/2008 | Wu et al. |
| 2008/0307322 A1 | 12/2008 | Stochosky et al. |
| 2008/0310604 A1 | 12/2008 | Agarwal et al. |
| 2009/0006936 A1* | 1/2009 | Parker et al. .................. 715/200 |
| 2009/0011743 A1 | 1/2009 | Johanson et al. |
| 2009/0013048 A1 | 1/2009 | Partaker et al. |
| 2009/0027480 A1 | 1/2009 | Choi |
| 2009/0030940 A1 | 1/2009 | Brezina et al. |
| 2009/0030988 A1 | 1/2009 | Kuhlke et al. |
| 2009/0037912 A1* | 2/2009 | Stoitsev et al. ............... 718/100 |
| 2009/0049447 A1* | 2/2009 | Parker .......................... 718/103 |
| 2009/0054088 A1 | 2/2009 | Abrantes et al. |
| 2009/0055185 A1 | 2/2009 | Nakade et al. |
| 2009/0069038 A1 | 3/2009 | Olague et al. |
| 2009/0092133 A1 | 4/2009 | Mok et al. |
| 2009/0100462 A1 | 4/2009 | Park et al. |
| 2009/0136013 A1 | 5/2009 | Kuykendall et al. |
| 2009/0143052 A1 | 6/2009 | Bates et al. |
| 2009/0143053 A1 | 6/2009 | Levien et al. |
| 2009/0154468 A1 | 6/2009 | Donovan |
| 2009/0158200 A1 | 6/2009 | Palahnuk et al. |
| 2009/0161626 A1 | 6/2009 | Crawford et al. |
| 2009/0170480 A1 | 7/2009 | Lee |
| 2009/0174680 A1 | 7/2009 | Anzures et al. |
| 2009/0177484 A1 | 7/2009 | Davis et al. |
| 2009/0177754 A1 | 7/2009 | Brezina et al. |
| 2009/0177981 A1 | 7/2009 | Christie et al. |
| 2009/0193023 A1 | 7/2009 | Dzikiewicz et al. |
| 2009/0216569 A1 | 8/2009 | Bonev et al. |
| 2009/0222299 A1* | 9/2009 | Clemenson et al. ............... 705/7 |
| 2009/0226871 A1* | 9/2009 | Etuk ...................... G06Q 20/06 434/323 |
| 2009/0232288 A1 | 9/2009 | Forbes et al. |
| 2009/0233542 A1 | 9/2009 | Gratton et al. |
| 2009/0240564 A1 | 9/2009 | Boerries et al. |
| 2009/0249244 A1 | 10/2009 | Robinson et al. |
| 2009/0286540 A1 | 11/2009 | Huber et al. |
| 2009/0288007 A1 | 11/2009 | Leacock et al. |
| 2009/0298519 A1 | 12/2009 | Chan et al. |
| 2009/0298556 A1 | 12/2009 | Raffle |
| 2009/0307614 A1 | 12/2009 | Craig et al. |
| 2009/0320073 A1 | 12/2009 | Reisman |
| 2009/0322893 A1 | 12/2009 | Stallings et al. |
| 2009/0327263 A1 | 12/2009 | Maghoul |
| 2009/0327953 A1 | 12/2009 | Honkala et al. |
| 2010/0001849 A1 | 1/2010 | Lee et al. |
| 2010/0020728 A1 | 1/2010 | Jefferson et al. |
| 2010/0050101 A1* | 2/2010 | Baik et al. .................... 715/764 |
| 2010/0058196 A1 | 3/2010 | Krishnan et al. |
| 2010/0064334 A1 | 3/2010 | Blackburn et al. |
| 2010/0077441 A1 | 3/2010 | Thomas et al. |
| 2010/0083253 A1* | 4/2010 | Kushwaha .................... 718/100 |
| 2010/0118158 A1 | 5/2010 | Boland et al. |
| 2010/0123816 A1 | 5/2010 | Koh et al. |
| 2010/0131691 A1 | 5/2010 | Chatterjee et al. |
| 2010/0138900 A1 | 6/2010 | Peterka et al. |
| 2010/0162133 A1 | 6/2010 | Pascal et al. |
| 2010/0162167 A1 | 6/2010 | Stallings et al. |
| 2010/0175000 A1 | 7/2010 | Gupta et al. |
| 2010/0180001 A1 | 7/2010 | Hardt |
| 2010/0185677 A1 | 7/2010 | Gupta et al. |
| 2010/0203833 A1 | 8/2010 | Dorsey |
| 2010/0205539 A1 | 8/2010 | Gestsson et al. |
| 2010/0223325 A1* | 9/2010 | Wendker et al. ............... 709/203 |
| 2010/0228560 A1 | 9/2010 | Balasaygun et al. |
| 2010/0251124 A1 | 9/2010 | Geppert et al. |
| 2010/0268793 A1* | 10/2010 | Wolff et al. ................... 709/217 |
| 2010/0280898 A1* | 11/2010 | Kasuya ....................... 705/14.33 |
| 2010/0297592 A1* | 11/2010 | Gengler et al. ............... 434/236 |
| 2010/0304729 A1 | 12/2010 | Sabotta et al. |
| 2010/0322395 A1 | 12/2010 | Michaelis et al. |
| 2011/0035673 A1 | 2/2011 | Chou et al. |
| 2011/0044438 A1 | 2/2011 | Wang et al. |
| 2011/0047226 A1 | 2/2011 | Gabriel et al. |
| 2011/0093544 A1 | 4/2011 | Yasrebi et al. |
| 2011/0093619 A1* | 4/2011 | Nelson ......................... 709/248 |
| 2011/0106736 A1* | 5/2011 | Aharonson .......... G06Q 10/109 706/12 |
| 2011/0115624 A1* | 5/2011 | Tran .................... G06F 19/3418 340/540 |
| 2011/0122827 A1 | 5/2011 | Bjorsell et al. |
| 2011/0126155 A1 | 5/2011 | Krishnaraj et al. |
| 2011/0145822 A1* | 6/2011 | Rowe et al. .................. 718/100 |
| 2011/0154244 A1 | 6/2011 | Howell et al. |
| 2011/0173111 A1* | 7/2011 | Cotton ........................... 705/35 |
| 2011/0173112 A1* | 7/2011 | Cotton ........................... 705/35 |
| 2011/0194466 A1 | 8/2011 | Kalele et al. |
| 2011/0209104 A1 | 8/2011 | Hinckley et al. |
| 2011/0273526 A1 | 11/2011 | Mehin et al. |
| 2011/0273576 A1* | 11/2011 | Zambetti ................ H04N 7/181 348/222.1 |
| 2011/0276885 A1 | 11/2011 | Gibson et al. |
| 2011/0276895 A1 | 11/2011 | Van der Fiier et al. |
| 2011/0276901 A1 | 11/2011 | Zambetti et al. |
| 2011/0276903 A1 | 11/2011 | Mehin et al. |
| 2011/0282706 A1* | 11/2011 | Ezra et al. .................... 705/7.15 |
| 2012/0084366 A1* | 4/2012 | Killoran et al. ............... 709/206 |
| 2012/0084367 A1* | 4/2012 | Killoran et al. ............... 709/206 |
| 2012/0110087 A1* | 5/2012 | Culver et al. ................. 709/205 |
| 2012/0117471 A1 | 5/2012 | Amidon et al. |
| 2012/0136775 A1* | 5/2012 | Cotton ........................... 705/38 |
| 2012/0158865 A1* | 6/2012 | Kurian et al. ................. 709/206 |
| 2012/0316962 A1* | 12/2012 | Rathod ......................... 705/14.54 |
| 2013/0024818 A1* | 1/2013 | Rainisto et al. ............... 715/838 |
| 2013/0104246 A1* | 4/2013 | Bear et al. ........................ 726/28 |
| 2013/0185190 A1* | 7/2013 | Cotton ........................... 705/38 |
| 2013/0211865 A1* | 8/2013 | Cotton ........................... 705/7.13 |
| 2013/0339461 A1* | 12/2013 | Killoran et al. ............... 709/206 |
| 2014/0006108 A1* | 1/2014 | Cotton ........................... 705/7.35 |

FOREIGN PATENT DOCUMENTS

| | | |
|---|---|---|
| EP | 2567543 A1 | 3/2013 |
| WO | WO 2011/140091 A1 | 11/2011 |
| WO | WO 2011/140098 A1 | 11/2011 |
| WO | WO 2011/140102 A1 | 11/2011 |
| WO | WO 2011/140104 A1 | 11/2011 |
| WO | WO 2011/140107 A1 | 11/2011 |
| WO | WO 2011/140122 A1 | 11/2011 |
| WO | WO 2011/140124 A1 | 11/2011 |
| WO | WO 2011/140127 A1 | 11/2011 |
| WO | WO 2011/140129 A1 | 11/2011 |

OTHER PUBLICATIONS

U.S. Appl. No. 12/981,998; NonFinal Office Action dated Dec. 3, 2012; 29 pages.
U.S. Appl. No. 12/982,017; NonFinal Office Action dated Dec. 21, 2012; 31 pages.
U.S. Appl. No. 12/982,024; NonFinal Office Action dated Jan. 4, 2013; 29 pages.
U.S. Appl. No. 12/982,030; NonFinal Office Action dated Jan. 18, 2013; 29 pages.
International Preliminary Report on Patentability prepared by the International Bureau of WIPO for PCT International Patent Application No. PCT/US11/35006, mailed Nov. 6, 2012, 8 pages.
International Preliminary Report on Patentability prepared by the International Bureau of WIPO for PCT International Patent Application No. PCT/US11/35015, mailed Nov. 6, 2012, 7 pages.
International Preliminary Report on Patentability prepared by the International Bureau of WIPO for PCT International Patent Application No. PCT/US11/35019, mailed Nov. 6, 2012, 7 pages.
International Preliminary Report on Patentability prepared by the International Bureau of WIPO for PCT International Patent Application No. PCT/US11/35021, mailed Nov. 6, 2012, 7 pages.

(56) References Cited

OTHER PUBLICATIONS

International Preliminary Report on Patentability prepared by the International Bureau of WIPO for PCT International Patent Application No. PCT/US11/35025, mailed Nov. 6, 2012, 7 pages.
International Preliminary Report on Patentability prepared by the International Bureau of WIPO for PCT International Patent Application No. PCT/US11/35042, mailed Nov. 6, 2012, 7 pages.
International Preliminary Report on Patentability prepared by the International Bureau of WIPO for PCT International Patent Application No. PCT/US11/35044, mailed Nov. 6, 2012, 6 pages.
International Preliminary Report on Patentability prepared by the International Bureau of WIPO for PCT International Patent Application No. PCT/US11/35047, mailed Nov. 6, 2012, 8 pages.
International Preliminary Report on Patentability prepared by the International Bureau of WIPO for PCT International Patent Application No. PCT/US11/35049, mailed Nov. 6, 2012, 6 pages.
U.S. Appl. No. 12/773,742, filed May 4, 2010, Gibson et al.
U.S. Appl. No. 12/773,747, filed May 4, 2010, Zambetti et al.
U.S. Appl. No. 12/981,917, filed Dec. 30, 2010, Mehin et al.
U.S. Appl. No. 12/981,973, filed Dec. 30, 2010, Van der Flier et al.
U.S. Appl. No. 12/981,987, filed Dec. 30, 2010, Van der Flier et al.
U.S. Appl. No. 12/981,998, filed Dec. 30, 2010, Van der Flier et al.
U.S. Appl. No. 12/982,009, filed Dec. 30, 2010, Zambetti et al.
U.S. Appl. No. 12/982,017, filed Dec. 30, 2010, Zambetti et al.
U.S. Appl. No. 12/982,024, filed Dec. 30, 2010, Zambetti et al.
U.S. Appl. No. 12/982,030, filed Dec. 30, 2010, Mehin et al.
U.S. Appl. No. 29/361,052, filed May 4, 2010, Van der Flier et al.
U.S. Appl. No. 29/361,056, filed May 4, 2010, Van der Flier et al.
International Search Report and Written Opinion prepared by the U.S. Patent and Trademark Office as International Searching Authority for PCT International Patent Application No. PCT/US11/35006, mailed Aug. 5, 2011, 23 pages.
International Search Report and Written Opinion prepared by the U.S. Patent and Trademark Office as International Searching Authority for PCT International Patent Application No. PCT/US11/35015, mailed Jul. 8, 2011, 13 pages.
International Search Report and Written Opinion prepared by the U.S. Patent and Trademark Office as International Searching Authority for PCT International Patent Application No. PCT/US11/35019, mailed Jul. 8, 2011, 12 pages.
International Search Report and Written Opinion prepared by the U.S. Patent and Trademark Office as International Searching Authority for PCT International Patent Application No. PCT/US11/35021, mailed Jul. 18, 2011, 15 pages.
International Search Report and Written Opinion prepared by the U.S. Patent and Trademark Office as International Searching Authority for PCT International Patent Application No. PCT/US11/35025, mailed Jul. 8, 2011, 12 pages.
International Search Report and Written Opinion prepared by the U.S. Patent and Trademark Office as International Searching Authority for PCT International Patent Application No. PCT/US11/35042, mailed Jul. 5, 2011, 13 pages.
International Search Report and Written Opinion prepared by the U.S. Patent and Trademark Office as International Searching Authority for PCT International Patent Application No. PCT/US11/35044, mailed Aug. 17, 2011, 12 pages.
International Search Report and Written Opinion prepared by the U.S. Patent and Trademark Office as International Searching Authority for PCT International Patent Application No. PCT/US11/35047, mailed Jul. 25, 2011, 13 pages.
International Search Report and Written Opinion prepared by the U.S. Patent and Trademark Office as International Searching Authority for PCT International Patent Application No. PCT/US11/35049, mailed Jul. 19, 2011, 12 pages.
Makela et al. (2009) Int. J. Communications, 3:169-247, "Mobility Trigger Management: Implementation and Evaluation".
U.S. Appl. No. 12/773,742; NonFinal Office Action dated May 20, 2013; 29 pages.
U.S. Appl. No. 12/773,742; Final Office Action dated Nov. 7, 2013; 67 pages.
U.S. Appl. No. 12/773,742; Final Office Action dated Apr. 23, 2014; 23 pages.
U.S. Appl. No. 12/773,747; NonFinal Office Action dated Mar. 19, 2013; 80 pages.
U.S. Appl. No. 12/773,747; Final Office Action dated Oct. 16, 2013; 24 pages.
U.S. Appl. No. 12/981,917; NonFinal Office Action dated Apr. 26, 2013; 28 pages.
U.S. Appl. No. 12/981,917; Final Office Action dated Oct. 11, 2013; 20 pages.
U.S. Appl. No. 12/981,973; NonFinal Office Action dated May 14, 2013; 34 pages.
U.S. Appl. No. 12/981,973; Final Office Action dated Oct. 8, 2013; 30 pages.
U.S. Appl. No. 12/981,973; NonFinal Office Action dated Feb. 25, 2014; 39 pages.
U.S. Appl. No. 12/981,987; NonFinal Office Action dated Sep. 6, 2013; 23 pages.
U.S. Appl. No. 12/981,987; Final Office Action dated Apr. 11, 2014; 19 pages.
U.S. Appl. No. 12/981,998; Final Office Action dated May 23, 2013; 27 pages.
U.S. Appl. No. 12/981,998; NonFinal Office Action dated Apr. 23, 2014; 28 pages.
U.S. Appl. No. 12/982,009; NonFinal Office Action dated Oct. 17, 2013; 28 pages.
U.S. Appl. No. 12/982,009; Final Office Action dated Apr. 30, 2014; 29 pages.
U.S. Appl. No. 12/982,017; Final Office Action dated May 22, 2013; 30 pages.
U.S. Appl. No. 12/982,017; NonFinal Office Action dated Apr. 23, 2014; 34 pages.
U.S. Appl. No. 12/982,024; Final Office Action dated Jun. 27, 2013; 28 pages.
U.S. Appl. No. 12/982,024; Advisory Action dated Sep. 11, 2013; 4 pages.
U.S. Appl. No. 12/982,024; NonFinal Office Action dated Apr. 23, 2014; 39 pages.
U.S. Appl. No. 12/982,030; Final Office Action dated Jun. 21, 2013; 26 pages.
U.S. Appl. No. 12/982,030; Advisory Action dated Aug. 29, 2013; 4 pages.
U.S. Appl. No. 12/982,030; NonFinal Office Action dated Jun. 24, 2014; 16 pages.
Brown et al., "Social Interaction in 'There'" (2004) University of Glasgow, Vienna Austria, pp. 1465-1468.
Emery, Using Jabberd as a Private Instant Messaging Service (2003) http://www.vanemery.com/Linux/Jabber/jabberd.html, accessed on Mar. 7, 2013, 13 pages.
Johns, "iChat Information Pages" (2013) http://web.archive.org/web/20081231192828/http://www.ralphjohns.eo.uk/versions/ichatl/howtos 1.html, accessed on Mar. 8, 2013, 20 pages.
Wikipedia, "Instant Messaging" (2013) http://en.wikipedia.org/w/index.php?title=Instant_messaging&oldid=280025030, accessed on Mar. 7, 2013, 11 pages.
U.S. Appl. No. 12/981,973; NonFinal Office Action dated Mar. 27, 2015; 30 pages.
U.S. Appl. No. 12/981,987; NonFinal Office Action dated Mar. 25, 2015; 27 pages.
Notification Concerning Availability of Publication of the International Application; PCT Patent Application No. PCT/US2011/035006; mailed Nov. 10, 2011; 1 page.
Notification Concerning Availability of Publication of the International Application; PCT Patent Application No. PCT/US2011/035015; mailed Nov. 10, 2011; 1 page.
Notification Concerning Availability of Publication of the International Application; PCT Patent Application No. PCT/US2011/035019; mailed Nov. 10, 2011; 1 page.
Notification Concerning Availability of Publication of the International Application; PCT Patent Application No. PCT/US2011/035021; mailed Nov. 10, 2011; 1 page.

(56) References Cited

OTHER PUBLICATIONS

Notification Concerning Availability of Publication of the International Application; PCT Patent Application No. PCT/US2011/035025; mailed Nov. 10, 2011; 1 page.
Notification Concerning Availability of Publication of the International Application; PCT Patent Application No. PCT/US2011/035042; mailed Nov. 10, 2011; 1 page.
Notification Concerning Availability of Publication of the International Application; PCT Patent Application No. PCT/US2011/035044; mailed Nov. 10, 2011; 1 page.
Notification Concerning Availability of Publication of the International Application; PCT Patent Application No. PCT/US2011/035047; mailed Nov. 10, 2011; 1 page.
Notification Concerning Availability of Publication of the International Application; PCT Patent Application No. PCT/US2011/035049; mailed Nov. 10, 2011; 1 page.
Oikarinen et al., "RFC 1459: Internet Relay Chat Protocol" (May 1993), 65 pages.
U.S. Appl. No. 12/773,742; Final Office Action dated Aug. 13, 2014; 26 pages.
U.S. Appl. No. 12/773,747; NonFinal Office Action dated Jan. 16, 2015; 117 pages.
U.S. Appl. No. 12/773,747; Notice of Publication dated Nov. 10, 2011; 1 page.
U.S. Appl. No. 12/981,987; NonFinal Office Action dated Sep. 11, 2014; 34 pages.
U.S. Appl. No. 12/981,998; Final Office Action dated Sep. 12, 2014; 38 pages.
U.S. Appl. No. 12/981,998; NonFinal Office Action dated Jan. 9, 2015; 31 pages.
U.S. Appl. No. 12/981,998; Notice of Publication dated Nov. 10, 2011; 1 page.
U.S. Appl. No. 12/982,017; Notice of Publication dated Nov. 10, 2011; 1 page.
U.S. Appl. No. 12/982,024 Notice of Publication dated Dec. 1, 2011; 1 page.
U.S. Appl. No. 12/982,030; Notice of Allowance & Interview Summary dated Dec. 10, 2014; 41 pages.
U.S. Appl. No. 12/982,030; Notice of Publication dated Nov. 10, 2011; 1 page.
U.S. Appl. No. 12/773,742; Notice of Publication dated Nov. 10, 2011; 1 page.
U.S. Appl. No. 12/981,917; Notice of Allowance dated Apr. 11, 2014; 32 pages.
U.S. Appl. No. 12/981,917; Notice of Publication dated Nov. 10, 2011; 1 page.
U.S. Appl. No. 12/981,973; Final Office Action dated Jul. 18, 2014; 23 pages.
U.S. Appl. No. 12/981,973; Notice of Publication dated Nov. 10, 2011; 1 page.
U.S. Appl. No. 12/981,987; Notice of Publication dated Nov. 10, 2011; 1 page.
U.S. Appl. No. 12/982,009; Notice of Publication dated Nov. 10, 2011; 1 page.
U.S. Appl. No. 12/982,009; Restriction Requirement dated May 23, 2013; 5 pages.
U.S. Appl. No. 12/982,017; Final Office Action dated Sep. 12, 2014; 42 pages.
U.S. Appl. No. 12/982,024; Final Office Action dated Oct. 23, 2014; 44 pages.
"Bulletin board system," from Wikipedia, May 1, 2009, downloaded Jul. 6, 2015; https://en.wikipedia.org/w/index.php?title=Bulletin_board_system&oldid=287208178; 9 pgs.
"Internet Protocol," Sep. 1981; Information Sciences Institute, University of Southern California; 98 pages.
"Jott Assistant," archived Apr. 30, 2009 by the Internet Wayback Machine, downloaded Jul. 1, 2015 from http://web.archive.org/20090430012129/http://jott.com/jott/jott-assistant.html; 4 pages.
"WhatsApp FAQ" archived Feb. 26th, 2010, by the Internet Wayback Machine, downloaded Jul. 8, 2015 from https://web.archive.org/web/20100222061103 1http://www.whatsapp.com/faq/#18; see p. 6, "Why do you ask for my phone number?"; 10 pages.
U.S. Appl. No. 12/773,742; Final Office Action dated Aug. 14, 2015; 37 pages.
U.S. Appl. No. 12/773,747; Final Office Action dated Jul. 21, 2015; 36 pages.
U.S. Appl. No. 12/981,973; Final Office Action dated Oct. 8, 2015; 29 pages.
U.S. Appl. No. 12/981,987; Final Office Action dated Sep. 4, 2015; 26 pages.
U.S. Appl. No. 12/981,998; Final Office Action dated Jun. 4, 2015; 40 pages.
U.S. Appl. No. 12/982,024; NonFinal Office Action dated Jun. 1, 2015; 44 pages.
U.S. Appl. No. 12/982,024; Final Office Action dated Oct. 9, 2015; 44 pages.
U.S. Appl. No. 12/981,973; NonFinal Office Action dated Jan. 14, 2016; 30 pages.
U.S. Appl. No. 12/981,987; NonFinal Office Action dated Apr. 13, 2016; 25 pages.
U.S. Appl. No. 12/981,998; NonFinal Office Action dated Feb. 10, 2016; 35 pages.

* cited by examiner

MULTI-USER INTEGRATED TASK LIST

CROSS-REFERENCE TO RELATED APPLICATIONS

This application claims the benefit, under 35 U.S.C. §119 (e), of provisional U.S. Application Ser. No. 61/331,318, filed on May 4, 2010 by Zambetti et al. and entitled "Multi-User Integrated Task List", the entire disclosure of which is incorporated herein by reference. This Application may also be related to the following commonly-assigned, co-pending applications (the "Related Applications"), the entire disclosure of each of which is hereby incorporated by reference:

U.S. application Ser. No. 12/773,742, filed May 4, 2010, by Gibson et al. and entitled "Multi-Client Local Network Base Station";

U.S. application Ser. No. 12/773,747, filed May 4, 2010 by Zambetti et al. and entitled "Family Chat";

U.S. application Ser. No. 12/981,917, filed on a date even herewith by Mehin et al. and entitled "Integrated Multi-Modal Chat", which claims the benefit of provisional U.S. Application Ser. No. 61/331,311, filed on May 4, 2010 by Mehin et al. and entitled "Integrated Multi-Modal Chat");

U.S. application Ser. No. 12/981,973, filed on a date even herewith by van der Flier et al. and entitled "Conversation Capture" which claims the benefit of provisional U.S. Application Ser. No. 61/331,316, filed on May 4, 2010 by van der Flier et al. and entitled "Conversation Capture";

U.S. application Ser. No. 12/981,987, filed on a date even herewith by Mehin et al. and entitled "Video Call Handling" which claims the benefit of provisional U.S. Application Ser. No. 61/331,337, filed on May 4, 2010 by Mehin et al. and entitled "Video Call Handling";

U.S. application Ser. No. 12/981,998, filed on a date even herewith by van der Flier et al. and entitled "Integrated Messaging Interface", which claims the benefit of provisional U.S. Application Ser. No. 61/331,319, filed on May 4, 2010 by van der Flier et al. and entitled "Integrated Messaging Interface";

U.S. application Ser. No. 12/982,009, filed on a date even herewith by Zambetti et al. and entitled "Video Recording Environment", which claims the benefit of provisional U.S. Application Ser. No. 61/331,339, filed on May 4, 2010 by Zambetti et al and entitled "Video Recording Environment";

U.S. application Ser. No. 12/982,017, filed on a date even herewith by Zambetti et al. and entitled "Photo Stack", which claims the benefit of provisional U.S. Application Ser. No. 61/331,341, filed on May 4, 2010 by Zambetti et al. and entitled "Photo Stack";

U.S. application Ser. No. 12/982,024, filed on a date even herewith by Zambetti et al. and entitled "Content-Driven Navigation", which claims the benefit of provisional U.S. Application Ser. No. 61/331,342, filed on May 4, 2010 by Zambetti et al. and entitled "Content-Driven Navigation"; and U.S. application Ser. No. 12/982,030, filed on a date even herewith by Mehin et al. and entitled "Doodle-In-Chat Context", which claims the benefit of provisional U.S. Application Ser. No. 61/331,344, filed on May 4, 2010 by Mehin et al. and entitled "Doodle-In-Chat Context".

FIELD

This disclosure relates, in general, to communications networks and services and, more particularly, to provision of enhanced communications and connectivity among users.

BACKGROUND

In many typical communications environments, users interact with communications services through a local network. For example, users within a home, office, enterprise branch location, etc. may interface with outside networks through routers and/or other network access systems. As voice, video, Internet, and other types of communications services converge, and as user network devices become increasingly portable, the network access systems are increasingly becoming hubs for substantially all user communications in proximity to the user's local network.

The increase in convergence and portability has provided many new types of user devices for interacting with communications services through the user's local network. However, there is typically little interactivity between the devices. As such, it may be difficult and/or inconvenient to use the devices in an integrative fashion, for example, to facilitate an integrated family or office environment.

In addition, while the increased functionality of personal communications technology has provided many benefits, many users, and in particular users within a household, have sometimes had difficulty in adapting that technology to household communications patterns. It therefore would be beneficial for modern household communications systems to conform more closely to household users' communication patterns, rather than forcing the household users to conform to usage patterns imposed by the technology.

BRIEF SUMMARY

Among other things, this disclosure describes tools and techniques for providing integrated, interactive communications services among multiple client devices in a local network. Some embodiments allow multiple user devices to be used in an integrative fashion to provide home management functionality, messaging functionality, videoconferencing functionality, cloud network interaction functionality, media sharing functionality, and/or other functionality. In another aspect, certain embodiments provide enhanced communication functionality by implementing chat, household activity tracking, media capture, and other communication functions in a manner that more closely conforms to typical household communications, resulting in an improve user experience, and in some cases, a more connected household.

One set of embodiments provides a communication system comprising a computing device. The communication system might also include other devices, such as a data store (which might take the form of a computer readable medium, and/or might include one or more databases, and/or the like), one or more display devices, one or more input devices, and one or more media capture devices (e.g., video capture devices, such as digital still or motion cameras, audio capture devices, such as microphones, and/or the like), all of which might be in communication with the computing device. In some cases, the data store, display devices, input devices, and/or media capture devices might be integrated within the computing device, while in other cases, they might be separate. In a particular aspect, the computing device might include (or be in communication with) one or more touch screens, which can serve as both a display device and an input device.

In an aspect, the computing device comprises at least one processor and at least one computer readable storage medium in communication with the at least one processor. The at least one computer readable storage medium might have encoded thereon a set of instructions that are executable by the processor to cause the computer system to perform one or more operations in accordance with the functionality of various embodiments, as described in further detail below and in the Related Applications. (It should be noted that, in some aspects, each of the Related Applications describe different feature sets that can be included and/or combined in any suitable fashion within particular embodiments.)\

In some cases, the computing device might be a general purpose computer, while in others it might take the form of a personal media device, smart phone, tablet computer, and/or the like. In still other cases, the computing device might be a special-purpose device designed specifically to provide the described functionality.

According to another set of embodiments, the computing device might be part of a supersystem that provides interactive communications services within a local network. The supersystem might include a tablet system, a handset system, and/or a base station system, any (or all) of which can serve as the computing device according to various implementations. The tablet system might include a first client subsystem and a first user interface module configured to provide interactivity with first communications services provided by the first client subsystem, the first client subsystem being communicatively coupled with the local network and a second client subsystem. The handset system might include a second client subsystem and a second user interface module configured to provide interactivity with second communications services provided by the second client subsystem, the second client subsystem being communicatively coupled with the local network and the first client subsystem. The base station system might include a first interface subsystem configured to removably couple the base station with the tablet system and a second interface subsystem configured to removably couple the base station with the handset system.

In one set of embodiments, the set of instructions is executable by the processor to cause the computing device to perform one or operations that might be considered part of a method (which itself can be a separate embodiment). Thus, the tools provided by various embodiments can include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, in one embodiment, a communication system for facilitating enhanced communications might comprise a computing device (e.g., as described above). The set of instructions for controlling operation of the device might include, for example, instructions for storing, in a data store, a multi-user task list comprising a plurality of tasks, each task being assigned to one or more users.

The set of instructions might further comprise instructions for generating a new task to add to the multi-user task list. Merely by way of example, the system might receive, via an input device at the computing device, user input pertaining to the new task. In another case, such user input might be received from a mobile device in communication with the computing device. In some cases, the set of instructions includes instructions for assigning one or more task properties to the new task, e.g., based on the user input.

The set of instructions might further include instructions for notifying one or more users of the new task. For example, in some embodiments, the set of instructions might include instructions for displaying an indication of the new tasks on a display device associated with the computing device (perhaps as part of a list of at least a portion of the plurality of tasks, which includes the new task). The plurality of tasks might be filtered, for example, by assigned user, to display only tasks assigned to a current user. In other cases, the instructions for notifying one or more users of the new task might comprise instructions for transmitting a notification to one or mobile devices associated with the one or more users. Such a notification might comprise, for example, a text message, an email message, and/or a voice message; alternatively and/or additionally, each of the one or more mobile devices might execute a household communication application that interacts with the household communication hub, and the notification might comprises a notification delivered with the household communication application.

In a set of embodiments, the set of instructions further comprises instructions for receiving an indication that the new task has been completed. There might also be further instructions for updating a record of the new task in the data store to indicate that the new task has been completed and/or instruction for notifying one or more users that the task has been completed.

In some cases, the task properties might include a task auditor that is responsible for determining whether the new task has been completed. In such cases, the set of instructions might further comprise instructions for notifying the task auditor of the indication that the new task has been completed and/or instructions for receiving, from the task auditor, confirmation that the new task has been completed. In such cases, the instructions for updating the record of the new task might comprise instructions for updating the record of the new task only upon receiving the confirmation from the task auditor.

In another set of embodiments, the task properties might include a reward for completion of the task, and the set of instructions might further comprise instructions for providing the reward to one or more users that completed the task. Sometimes, the reward might be a hidden reward, in that the existence of the reward and/or the nature of the reward is hidden until the task has been completed. A variety of different types of rewards are possible. Merely by way of example, the reward might comprise a credit to an account separate from the communication system, such as an account at a financial institution and/or a prepaid account at an electronic commerce provider.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
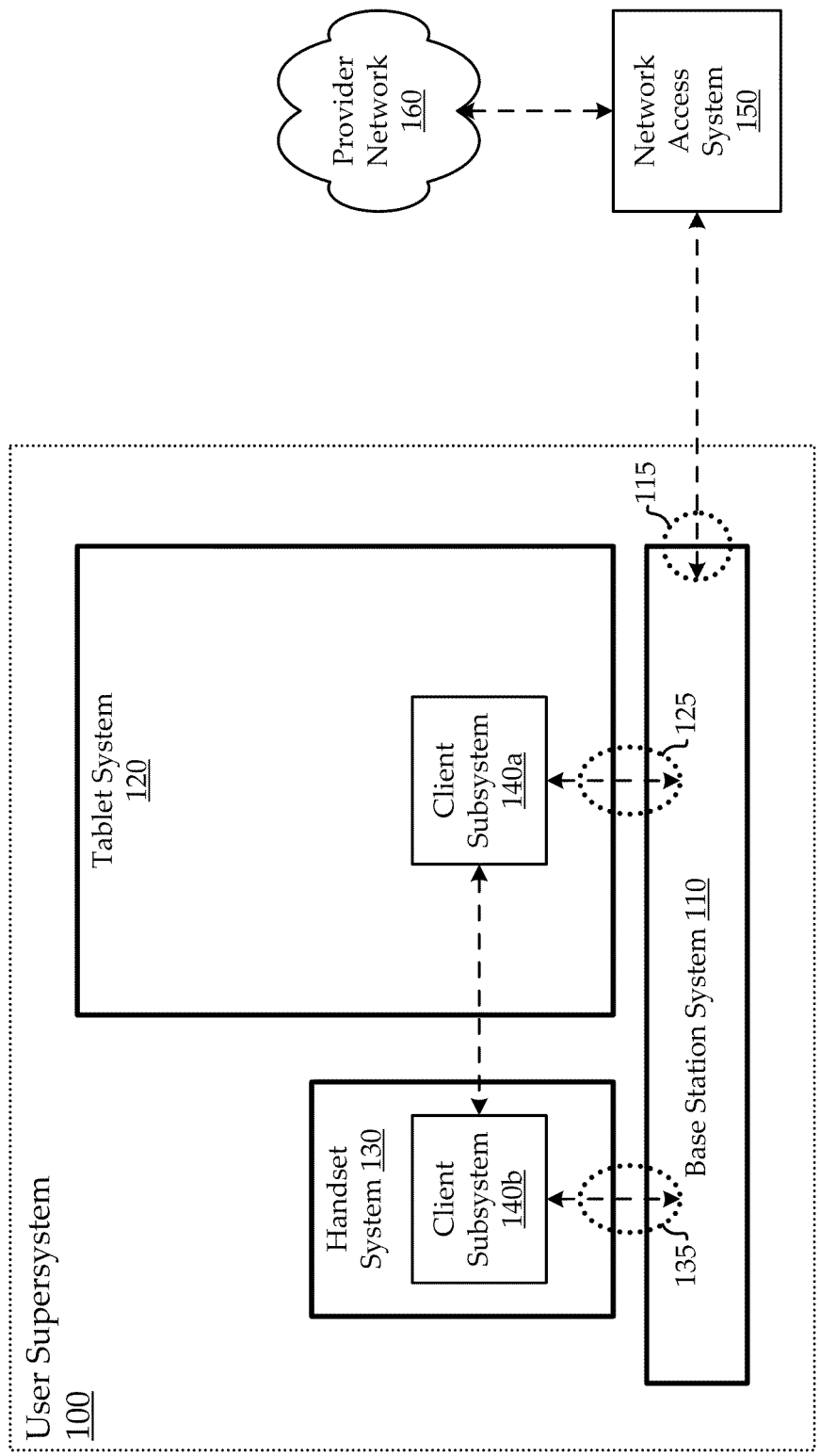
FIG. 1A shows a simplified block diagram of an illustrative user supersystem in communication with a provider network, according to various embodiments.

The present invention relates, in general, to communications networks and services and, more particularly, to providing multi-user communications services through a communications hub disposed within a local network.

In many typical communications environments, users interact with communications services through a local network. For example, users within a home, office, enterprise branch location, etc. may interface with outside networks through routers and/or other network access systems. As voice, video, Internet, and other types of communications services converge, and as user network devices become increasingly portable, the network access systems are increasingly becoming hubs for substantially all user communications in proximity to the user's local network.

The increase in convergence and portability has provided many new types of user devices for interacting with communications services through the user's local network. However, there is typically little interactivity between the devices. As such, it may be difficult and/or inconvenient to use the devices in an integrative fashion, for example, to facilitate an integrated family or office environment.

Embodiments allow multiple user devices to be used in an integrative fashion to provide home management functionality, messaging functionality, videoconferencing functionality, cloud network interaction functionality, media sharing functionality, and/or other functionality. According to some embodiments, a supersystem is provided that includes at least one base station and at least two clients. Functionality of the supersystem and its component systems will be appreciated through various illustrative embodiments described herein.

The following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

Turning first to FIG. 1A, a simplified block diagram is shown of an illustrative user supersystem 100 in communication with a provider network 160, according to various embodiments. The user supersystem 100 includes a base station system 110, a tablet system 120, and a handset system 130. Each of the tablet system 120 and the handset system 130 includes a client subsystem 140.

The user supersystem 100 interfaces with the provider network 160 via a network access system 150. As described more fully below, the network access system 150 may include a network interface device (NID), a router (e.g., a network address translation (NAT) router), and/or any other component used to provide subnet functionality. For example, because of the network access system 150, the user supersystem 100 may operate in the context of a local network. As used herein, "local network," "user network," "home network," and similar phraseology is used broadly and interchangeably to include any type of subnet, like a local area network (LAN). It is understood that different types of local networks may be used in various embodiments without departing from the scope of the invention. For example, different local networks may operate using different protocols, different types of security, different architectures or topologies, etc.

In various embodiments, the tablet system 120, the handset system 130, and/or the base station system 110 are configured to provide interactive communications services to the client subsystems 140 within the local network. For example, the tablet system 120 and the handset system 130 may provide a user with communications functionality for interacting with a public network (e.g., the Internet), with the provider network 160 (e.g., for various provider services, like cloud storage and application serving), with other devices on the local network (e.g., computers, smart appliances, baby monitors, networked televisions, etc.), etc. Further, as described more fully below, the interactive communications functionality may include integrations between the tablet system 120 and the handset system 130 (e.g., application hand-offs and integrations, offloading, etc.). The various features of the user supersystem 100 are implemented through its various component systems—the base station system 110, the tablet system 120, and the handset system 130. Each of these components systems will be described in turn.

Embodiments of the base station system 110 are configured with different types of functionality. In some embodiments, the base station system 110 is configured as a base for mounting one or both of the tablet system 120 and the handset system 130. For example, a tablet interface region 125 and a handset interface region 135 may be configured to physically receive a portion of the tablet system 120 and handset system 130, respectively (e.g., for docking). In another embodiment, the base station system 110 is configured as a special-purpose mount for interfacing the tablet system 120 and/or the handset system 130 with a fixture or other element (as an under-cabinet mount).

According to other embodiments, the base station system 110 includes charging functionality for charging the tablet system 120 and/or the handset system 130. For example, the charging may be contactless (e.g., by induction) or by physical ports and/or cables configured to interface with cables and/or ports on the respective tablet system 120 or handset system 130. According to still other embodiments, the base station system 110 includes communications functionality. Embodiments of the base station system 110 may be configured to provide the functionality of a wireless fidelity (WiFi) hotspot, a wireless repeater, a network hub, a network router (e.g., with or without network address translation (NAT) functionality), a picocell or femtocell, etc. For example, as shown, the base station system 110 may include a network interface region 115 for interfacing with the network access system 150. Certain embodiments may provide interactive communications between the provider network 160 (e.g., and/or other networks) and the client subsystems 140 (e.g., via the tablet interface region 125 and the handset interface region 135). These and other functions of the base station system 110 will be described more fully below (e.g., with reference to FIG. 4).

Other functionality of the user supersystem 100 is provided by the tablet system 120, the handset system 130, and/or their respective client subsystems 140. Embodiments of the tablet system 120 are typically implemented substantially as a tablet computing environment. The tablet system 120 may include a large display. The display may be active or passive; responsive to touch by a finger, stylus, or other implement; responsive to remote interactions, etc. Other interactivity may be provided by voice capture (e.g., audio-to-text translation, direct voice recording, etc.), by motion capture (e.g., gestures, etc.), and or in any other useful way.

In some embodiments, the tablet system 120 includes additional input/output components or features. Embodiments include a still and/or video capture device (e.g., a digital video camera), an integrated speaker, and/or ports (e.g., physical and/or logical) for interfacing with peripheral devices. For example, the tablet system 120 may be configured to interface with peripheral cameras, keyboards, printers, scanners, sensors, etc. In certain embodiments, the tablet system 120 interfaces with one or more peripherals via the base station system 110. For example, the base station system 110 may include a USB hub or a Bluetooth receiver, by which the tablet system 120 interfaces with a compatible keyboard.

In some embodiment, a digital video camera is integrated within the chassis of the tablet system 120, such that it can be pointed in various directions. In one embodiment, the camera swivels to point either in a direction substantially normal to the display (e.g., typically toward the primary user of the tablet system 120) or in an opposite direction (e.g., typically away from the primary user of the tablet system 120). Video captured by the camera may also be displayed substantially in real time on the display.

For example, suppose a first user employs the tablet system 120 to place a video call with a second user to show off a new home renovation. The first user may be able to see both the first user's camera input and the second user's camera input (e.g., as picture-in-picture, side-by-side, etc.) on the first user's display. By pointing the camera in a direction opposite the display and walking around the renovation with the tablet system 120, the first user may see both what the second user is seeing (i.e., the new renovation video capture) and the second user's reaction on the same display at the same time.

Embodiments of the handset system 130 provide various types of functionality, some similar to that of the tablet system 120. The handset system 130 may typically be implemented in a physical format similar to that of a cell phone, personal digital assistant (PDA), remote control, etc. (i.e., portable and ergonomic). The handset system 130 may be configured to receive user interactions through various types of controls. For example, some or all of the controls may be implemented as soft controls through a touch screen, additional controls may be implemented as hard buttons, etc. In certain embodiments, the handset system 130 includes a camera. In one embodiment, the camera is substantially identical to that of the tablet system 120. Of course, the handset system 130 may include additional components, such as microphones and speakers, ports and jacks, etc.

Notably, as described more fully below, embodiments of the tablet system 120 and the handset system 130 are designed and configured to provide an integrated experience. Using the example above, suppose a first user has employed the tablet system 120 to place a video call with a second user to show off a new home renovation. During the call, the first user decides that it would be more convenient to walk around with the handset system 130. The first user may pick up the handset system 130 and continue the call (e.g., substantially seamlessly hand off the video call from the tablet system 120 to the handset system 130). In one embodiment, the tablet system 120 and/or the handset system 130 may display a soft button (e.g., "send to handset") to execute the hand-off. In another embodiment, removing the handset system 130 from the base station system 110 may automatically initiate the hand-off. In another embodiment, moving the handset system 130 out of direct proximity to the tablet system 120 (e.g., separating them by more than eighteen inches) may automatically initiate the hand-off.

While the tablet system 120 and the handset system 130 are described above with reference to certain hardware components (e.g., cameras, displays, etc.), it will be appreciated that much of the functionality of those systems is in fact implemented by their respective client subsystems 140. In various embodiments, each client subsystem 140 may be a "hard" client subsystem 140, a "soft" client subsystem 140, or some combination. For example, the client subsystem 140 may be implemented, in whole or in part, in hardware. Thus, it may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, as illustrated by the dashed line between client subsystems 140, there may be communications between the client subsystems 140. In some embodiments, the communications are direct between components of the client subsystems 140 themselves. In other embodiments, the communications are routed through components of the tablet system 120 and the handset system 130. In still other embodiments, the communications are routed through components of the base station system 110. And in other embodiments, the communications are routed through one or more other components of the local network, for example, the network access system 150.

Figure 1B:
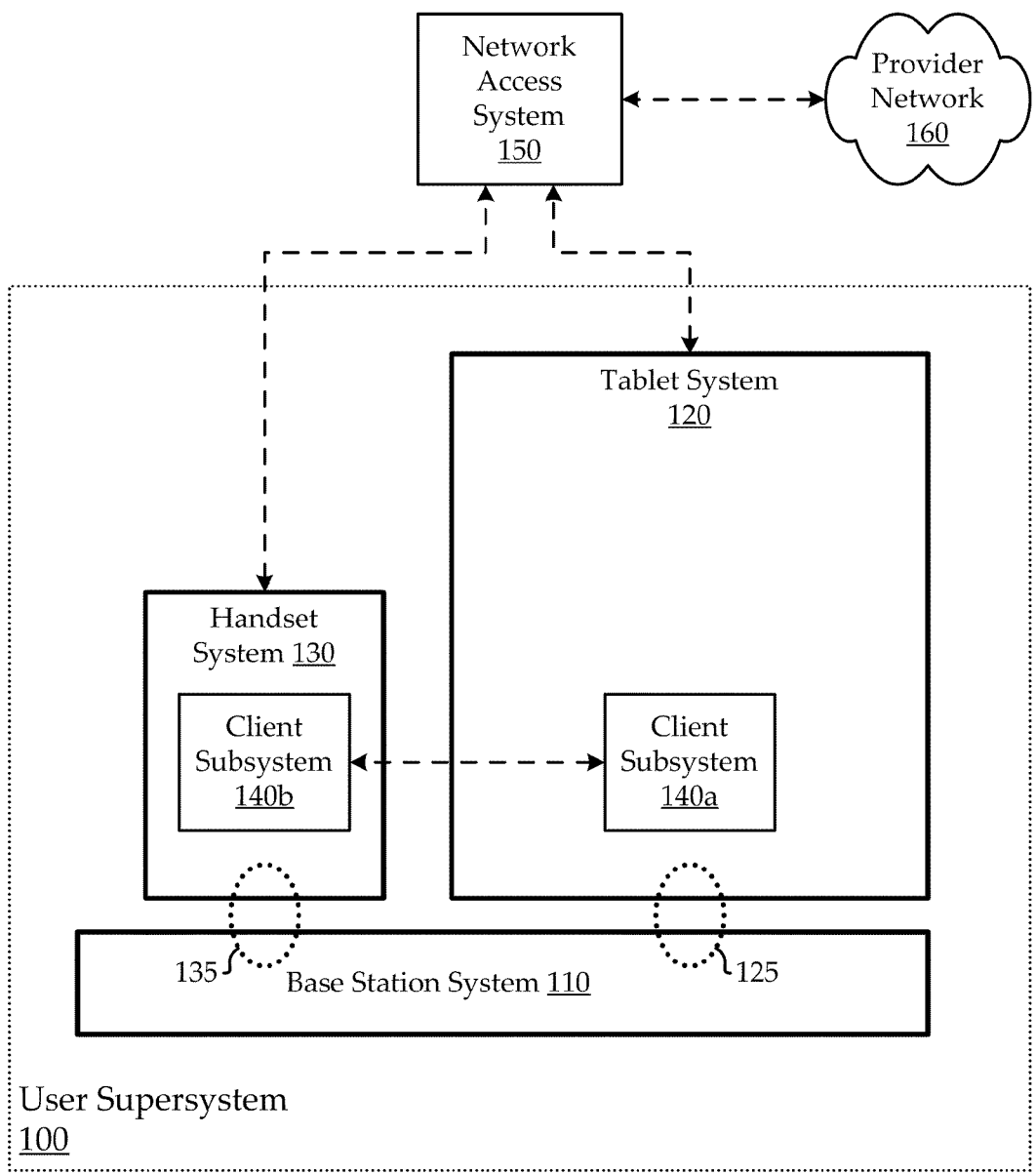
FIG. 1B shows a simplified block diagram of another illustrative user supersystem in communication with a provider network, where the base station system provides little or no communications functionality, according to various embodiments.

It will be appreciated that many types of user supersystem 100 are possible with many types and/or numbers of component systems. For the sake of illustration, some of these alternate embodiments are described with reference to FIGS. 1B and 1C. For example, in some embodiments, the base station system 110 does not provide any communications functionality. FIG. 1B shows a simplified block diagram of another illustrative user supersystem 100 in communication with a provider network 160, where the base station system 110 provides little or no communications functionality, according to various embodiments.

As in FIG. 1A, the user supersystem 100 includes a base station system 110, a tablet system 120, and a handset system 130. Each of the tablet system 120 and the handset system 130 includes a client subsystem 140. In the embodiment of FIG. 1B, however, the network access system 150 is illustrated as being in direct communication with the tablet system 120 and the handset system 130, and not through the base station system 110. For example, each of the tablet system 120 and the handset system 130, and/or their respective client subsystems 140, may be configured to communicate directly with the local network (e.g., with the network access system 150).

It is worth noting that, where the base station system 110 does not provide communications functionality, there may be no need for a network interface region 115. Further, there may be no need to provide communications via the tablet interface region 125 or the handset interface region 135. For example, unlike in the embodiment of FIG. 1A, there may be no physical and/or logical (e.g., unwired) communications path between the base station system 110 and the tablet system 120 or the handset system 130 via the tablet interface region 125 or the handset interface region 135, respectively. Still, interface regions of the base station system 110 may provide various types of mounting functionality, charging functionality, etc., for example, as described above.

Figure 1C:
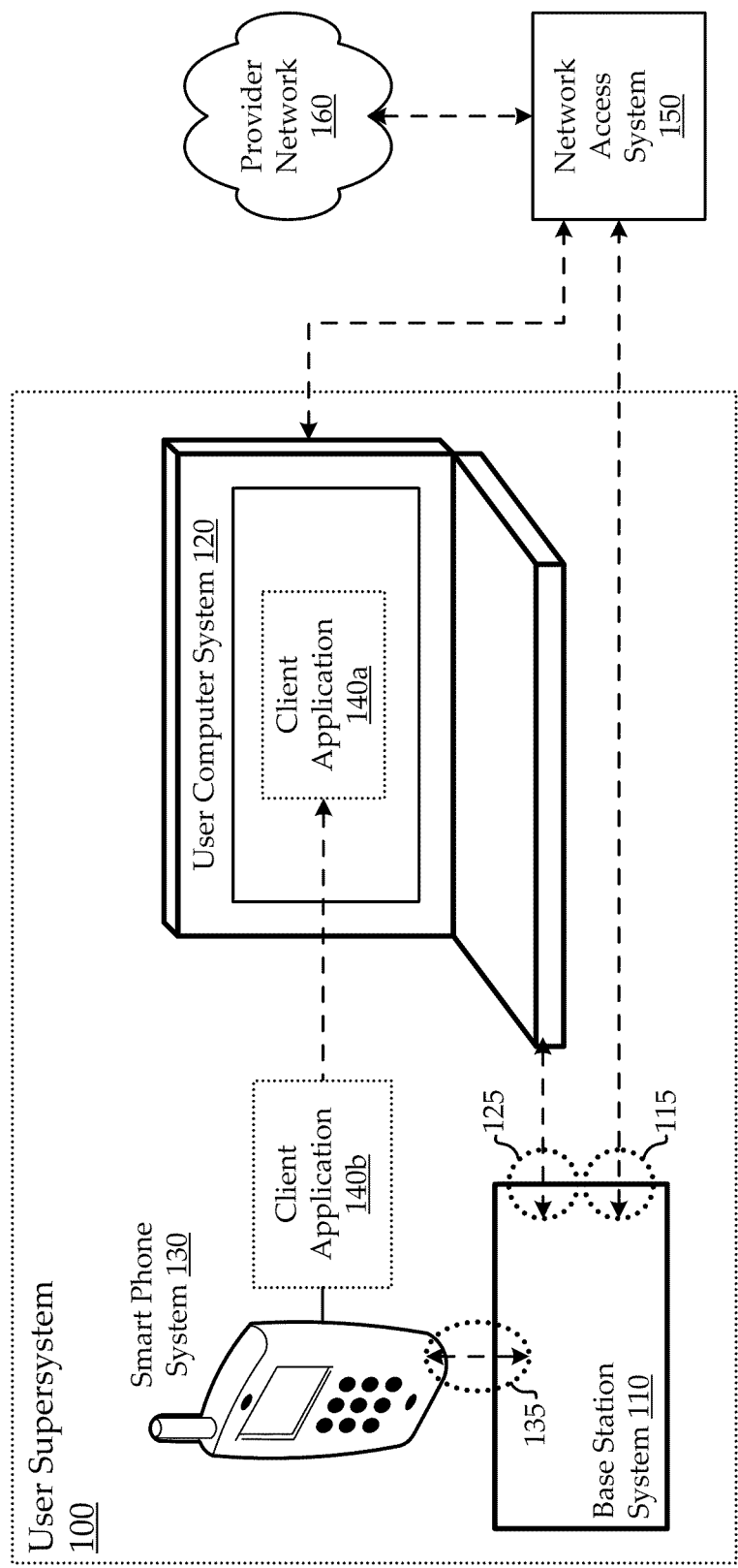
FIG. 1C shows a simplified block diagram of yet another illustrative user supersystem in communication with a provider network, where the base station system physically interfaces only with the tablet system, and where certain standard tablet system and handset system components are used, according to various embodiments.

FIG. 1C shows a simplified block diagram of yet another illustrative user supersystem 100 in communication with a provider network 160, where the base station system 110 physically interfaces only with the tablet system 120, and where certain standard tablet system 120 and handset system 130 components are used, according to various embodiments. Again, as in FIG. 1A, the user supersystem 100 includes a base station system 110, a tablet system 120, and a handset system 130, and each of the tablet system 120 and the handset system 130 includes a client subsystem 140.

As illustrated, the tablet system 120 may be implemented as a standard (e.g., multi-purpose, undedicated) laptop or tablet computing environment, and the handset system 130 may be implemented as a standard smart phone environment. The client subsystems 140 are also shown as client applications. For example, some functionality of the client subsystem 140b shown as part of the handset system 130 of FIG. 1A may be implemented as an application running on a standard smart phone. In alternate embodiments, a dedicated handset system 130 (e.g., as shown in FIG. 1A) may be used with a standard tablet system 120 (e.g., as shown in FIG. 1C), or a standard handset system 130 (e.g., as shown in FIG. 1C) may be used with a dedicated tablet system 120 (e.g., as shown in FIG. 1A).

Other types of base station system 110 may be used as well, according to various embodiments. For example, as illustrated, the base station system 110 may be configured to physically interface with (e.g., provide docking for) the handset system 130 via a handset interface region 135, and to provide communications with the tablet system 120 via the tablet interface region 125 (e.g., by a wired or unwired communications path).

Further, the user supersystem 100 may interface with the local network in various ways. As illustrated, the base station system 110 is in communication with the network access system 150, the tablet system 120 is shown in communication both with the base station system 110 and with the network access system 150, and the handset system 130 is shown in communication only with the base station system 110. Of course, in alternate embodiments, the base station system 110 may not be in communication with the local network (e.g., as described with reference to FIG. 1B), the handset system 130 may have a direct communications path to the network access system 150, etc.

Figure 2:
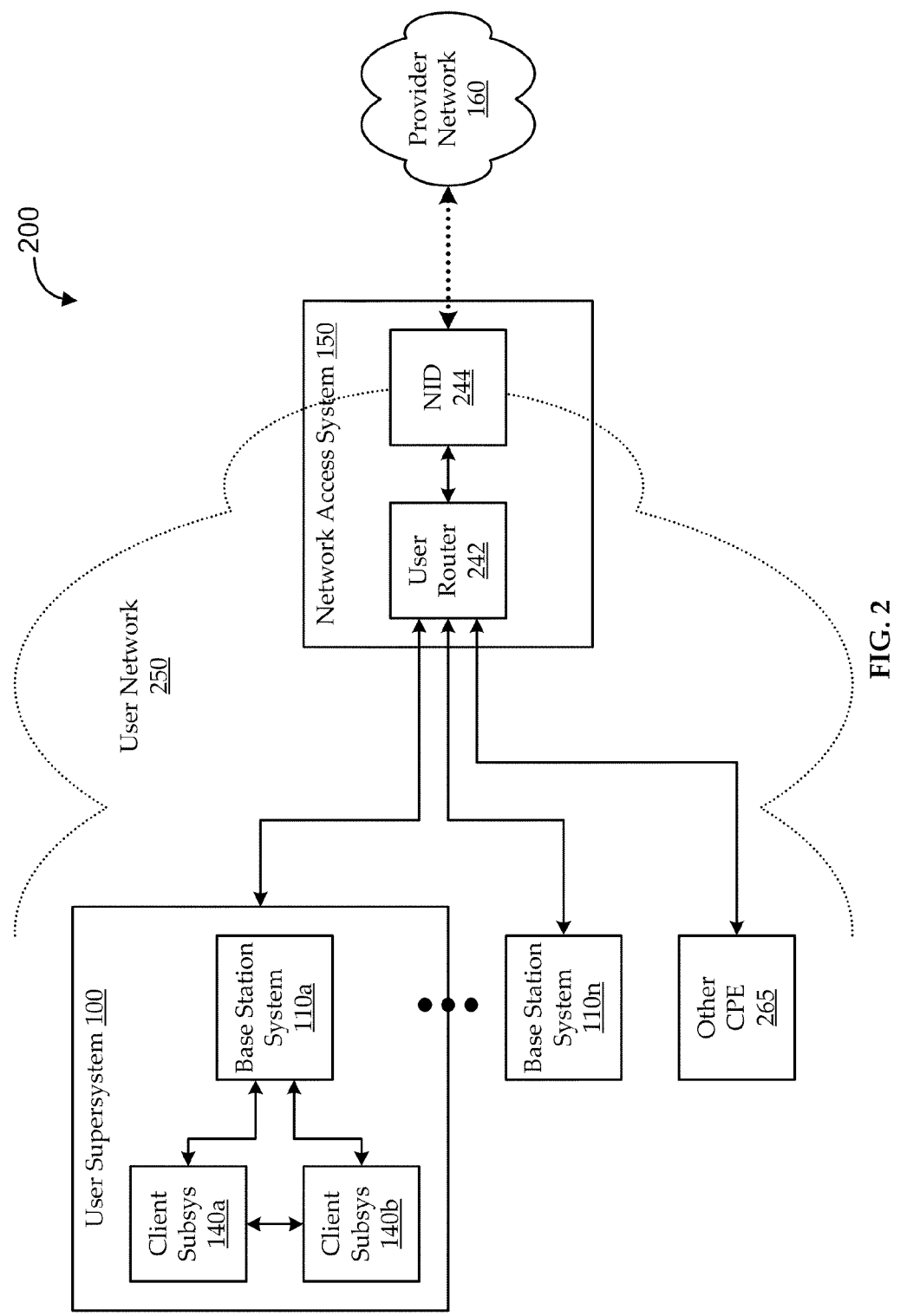
FIG. 2 shows a communications system that includes a user network having multiple clients, according to various embodiments.

While each of the illustrative embodiments shown in FIGS. 1A-1C shows a single user supersystem 100 alone in its local network, user supersystems 100 may operate in the context of other devices in a local network. FIG. 2 shows a communications system 200 that includes a user network 250 having multiple clients, according to various embodiments. As illustrated, the user network 250 includes a user supersystem 100 and other devices in communication with a provider network 160 via a network access system 150.

It will be appreciated that many types of provider network 160 are possible. For example, the provider network 160 may include a cable, direct subscriber line (DSL), satellite, and/or other type of network topology. Further, different types of provider networks 160 may include different topologies or architectures between portions of the provider network 160 and between other networks, such as the Internet.

For example, according to one type of network topology, access networks from individual customers are aggregated in one or more locations within the provider network 160 (e.g., apartment access networks maybe aggregated at a building level, again at a neighborhood level, again at a service area level, etc.), with various aggregated regions being serviced by one or more main provider locations (e.g., central offices). At those or other locations, the provider network 160 may interface with other networks, for example, through various types of peering relationships, etc. Typically, non-customers may interface with customers in the provider network 160 through the public network.

As such, different types of network architectures and topologies may be used with various embodiments, such that different types of components may be required and/or desired at a user's premises to interface with an access portion of the provider network 160. For example, various types of receivers, ports, modems, etc. may be used at the user premises to interface the user's user network 250 with the provider network 160. The interface between the user network 250 and the provider network 160 may be implemented by components of the network access system 150.

In one embodiment, the network access system 150 includes a NID 244 and a user router 242. The NID 244 may include some or all of the components used to interface the user's access portion of the provider network 260 (e.g., the phone line, cable, fiber, etc. going to the user's home) with the user's premises. The NID 244 may be mounted internal or external to the user's premises (e.g., or some combination), and may include regions that are restricted to the user (e.g., accessible only to a service provider). In various embodiments, the NID 244 may provide various types of functionality, including network address translation, switching, routing, filtering, serving (e.g., using a micro-server), storage, cooling, monitoring, etc.

In embodiments where the NID 244 does not include a router or where additional routing is desired, the network access system 150 may further include the user router 242. The user router 242 may include a network address translator (NAT) router, a port address translation (PAT) device, a single-address NAT, a port-level multiplexed NAT, a static or dynamic NAT, a firewall, etc. The router may be particularly useful where multiple devices within the user network 250 are being used to communicate outside the user network 250, as in FIG. 2.

Regardless of the particulars of the provider network 160 and the network access system 150, the result may be manifest as a local user network 250. For example, the network access system 150 may include any components or functionality desired to provide services from the provider network 160 to the user network 250 and/or among the devices within the user network 250, such that the user network 250 operates as a subnet.

As illustrated, the user network 250 may include a user supersystem 100, an additional base station system 110*n*, and one or more other customer premises equipment (CPE) devices 265. For example, the CPE devices 265 may include computer systems (e.g., laptops, personal computers, tablet computers, etc.), television equipment (e.g., networked or Internet-enabled television sets, set-top boxes, etc.), smart phones, smart appliances (e.g., networked lighting, refrigerators, water heaters, etc.), sensor equipment (e.g., smoke or radon alarms, thermostats, baby monitors, etc.), etc. Of course, any other types or numbers of devices or systems may be included in the user network 250. Each of these devices or systems may be in direct or indirect communication with the network access system 150 (e.g., via the user router 242).

Multiple base station systems 110 may be used in a topology, like the one illustrated in FIG. 2, to provide certain enhanced functionality. As described above, the base station systems 110 may be configured to provide certain types of communications functionality. For example, the base station systems 110 may act as Wi-Fi hotspots or repeaters. When there are multiple base station systems 110 in the user network 250, the client subsystems 140 may be configured to interface with the base station system 110 having the strongest signal (e.g., or the closest base station system 110, the base station system 110 having certain functionality, etc.).

It will be appreciated that these and/or other techniques may be used to provide a substantially ubiquitous unwired connectivity experience throughout the user's premises. Notably, changes in signal integrity may affect apparent latency, error rates, bandwidth, and/or other connectivity conditions. For example, as a home user moves between room or floors, and even external to the home within some range, it may be desirable for the user to experience a substantially consistent connectivity experience.

For example, the user supersystem 100 is illustrated as including two client subsystems 140 in communication with each other and with a first base station system 110*a*. If one or both of the client subsystems 140 is moved out of operational range of the first base station system 110*a* and into operational range of a second base station system 110*n*, the one or both client subsystems 140 may automatically switch to being in communication with the second base station system 110*n*. Accordingly, the user supersystem 100 definition may dynamically update to capture changes in topology.

For the sake of illustration, a customer calls a fabric seller to inquire about a particular fabric. A video session is initiated, beginning with the fabric seller sitting at her desk in front of the tablet system 120 of her user supersystem 100 (e.g., acting as a first client subsystem 140*a*). She desires to show the customer the requested fabric, while also illustrating the breadth of her fabric stock and the attractiveness of her storefront to entice the customer to visit in person. To this end, she seamlessly hands the video session off to her handset system 130 (e.g., acting as a second client subsystem 140*b*) and virtually walks the customer (i.e., via real-time video capture) through the store to the location of the requested fabric, all the while remotely watching the customer's reaction on the handset system 130 display. The requested fabric is located on the second floor of the store, far from the base station system 110 (e.g., which may be collocated with the tablet system 120). However, the fabric seller has an additional base station system 110 configured as a repeater on the second floor for boosting the signal in that area of the store (e.g., for when the handset system 130 is in proximity). As such, she is able to maintain a high quality, real-time video stream with her customer throughout the communications session.

It will be appreciated that other types of integrations are possible in a user network 250, like the one illustrated in FIG. 2. For example, as described above, the client subsystems 140 may interact and/or be integrated with each other. Further, in certain embodiments, the client subsystems 140 may be configured to interface with one or more other CPE devices 265. For example, the tablet system 120 may be configured to display a monitor of current energy use by smart appliances in the home, to remotely control lights and/or other devices in the home, to monitor a closed caption video feed (e.g., from a security system), etc. These types of integrations may be implemented by direct communication links, through one or more base station systems 110, through components of the network access system 150, through other devices in the user network 250, etc.

Of course, it may be desirable for devices or systems in one user network 250 to interface with devices or systems in another user network 250. Each of the illustrative embodiments shown in FIGS. 1A-1C shows only a single user supersystem 100, and the embodiment of FIG. 2 shows only a single user network 250. However, user supersystems 100 may typically operate in the context of a larger communications system having multiple users with multiple user networks 250, each having multiple devices and systems.

Figure 3:
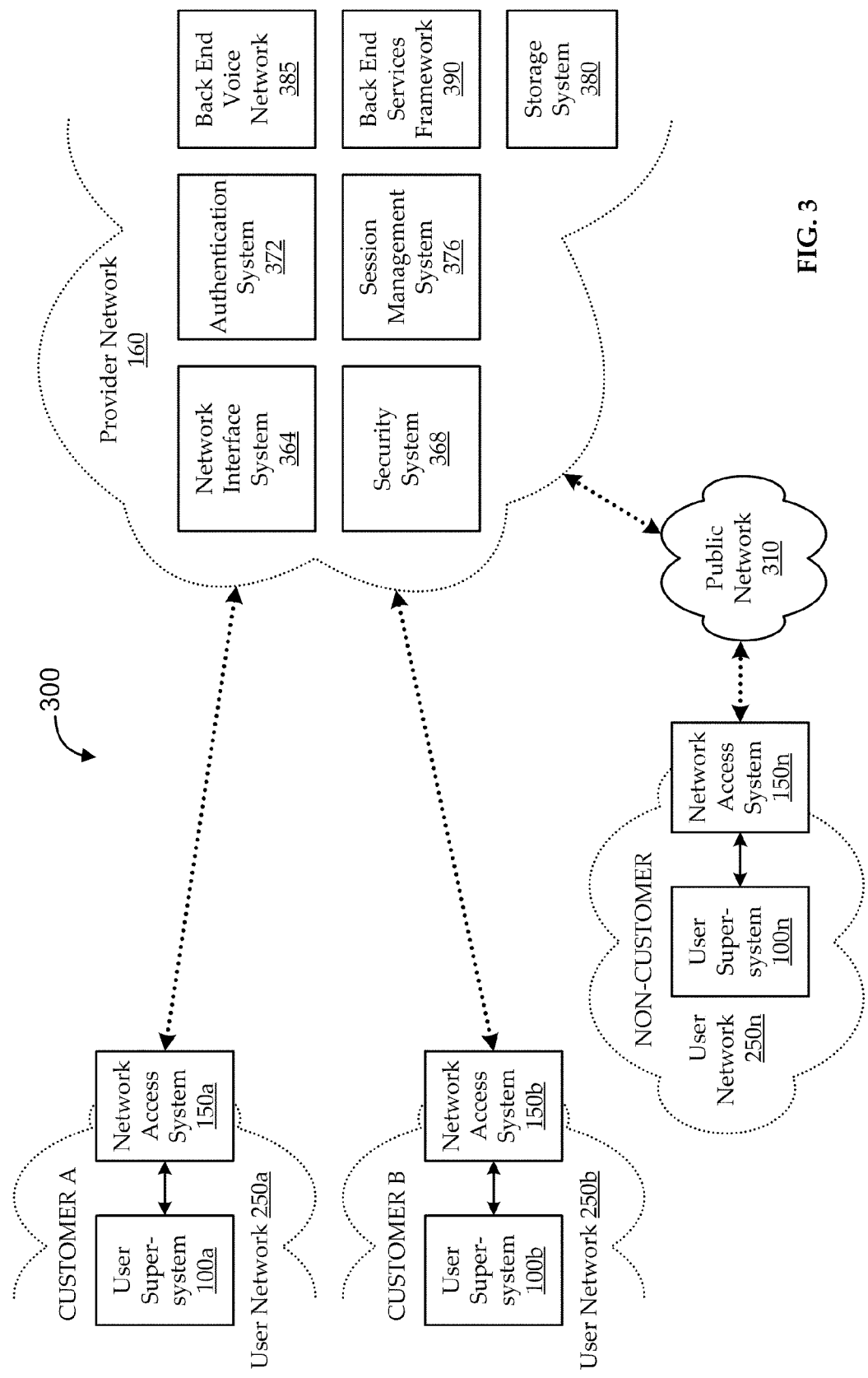
FIG. 3 shows a communications system that includes multiple user networks, according to various embodiments.

FIG. 3 shows a communications system 300 that includes multiple user networks 250, according to various embodiments. As illustrated, the user network 250 includes a user supersystem 100 in communication with a common provider network 160 via a network access system 150. Notably, a first user network 250*a* is associated with a first customer ("Customer A") of the service provider associated with the provider network 160, a second user network 250*b* is associated with a second customer ("Customer B") of the service provider, and a third user network 250*c* is associated with a user that is not a customer of the service provider ("Non-Customer").

As described above, in some network topologies, customers may be in substantially direct communication with the provider network 160, while non-customers may have access to the provider network 160 only through the public network 310 (e.g., the Internet). In certain embodiments, the communications to and from the respective network access systems 150 are substantially the same, regardless of whether the user network 250 is associated with a customer. In other embodiments, certain additional or alternate functionality is available to customers. For example, when the service provider has less or no control over the access network to a user (e.g., for non-customers), provision of certain services may be difficult, impractical, or impossible (e.g., provision of certain services may be to slow, too costly, etc. when offered through the public network). In still other embodiments, various types of relationships (e.g., peering relationships, content delivery or mirroring relationships, etc.) may be used to provide similar services to both customers and non-customers.

Typically, services are provided by the service provider from the provider network 160. As illustrated, the provider network 160 may be described in terms of a number of functional blocks. For example, the provider network 160 may include a network interface system 364, a security system 368, an authentication system 372, a session management system 376, a storage system 380, a back-end voice network 385, and a back-end services framework 390. Notably, these functional blocks may, in fact, be collocated or distributed, implemented in one or more components or systems, implemented in hardware or software, etc., according to various embodiments. As such, descriptions of functionality of the provider network 160 in this context is intended to add clarity to the description and should not be construed as limiting the scope of embodiments.

In some embodiments, communications to and from various user networks 250 (e.g., via their respective network access systems 150) interface with the provider network 160 at the network interface system 364. Embodiments of the network interface system 364 may include any type of components, subsystems, etc. for interfacing with the user access networks, with the public network 310, and/or with additional networks (e.g., content delivery networks (CDNs), back-haul networks, peer networks, proprietary networks, etc.). For example, the network interface system 364 may include and handle various ports and connections, implement signal processing functions (e.g., modulations and demodulations), implement protocol handling, etc.

In some embodiments, communications are further handled by the security system 368. For example, it may be desirable for functionality of the network interface system 364 to be enhanced with logical security (e.g., firewalls, encryption, etc.) and/or with physical security (e.g., locked servers, etc.). Notably, functionality of the security system 368 may be further applied to other systems of the provider network 160. For example, physical and/or logical security may be applied to some or all of the authentication system 372, storage system 380, etc.

In addition to the types of security provided by the security system 368, other types of user (e.g., or device, system, network, etc.) authentication may be desired. Embodiments of the authentication system 372 are used for authorization, authentication, accounting, registration, and/or other similar functionality. For example, the authentication system 372 may include functionality of an "Authentication, Authorization, and Accounting" (AAA) server, a "Remote Authentication Dial In User Service" (RADIUS), etc. In one embodiment, the network interface system 364 implements a Network Access Server (NAS) in communication with a RADIUS server implemented by the authentication system 372.

In other embodiments, the authentication system 372 may be used to perform other types of authentication and registration. In one embodiment, new devices in a user network 250 may send a registration request to the authentication system 372, which may keep track of and/or authorize user devices. In another embodiment, individual communications sessions are authorized, registered, etc. by the authentication system 372. In still another embodiment, the authentication system 372 handles authentication credentials of non-customers (e.g., using cookies, etc.), content providers, etc. In yet other embodiments, the authentication system 372 handles additional accounting functions, such as usage tracking against fair access policies (FAPs), etc.

As discussed above, embodiments of the user supersystems 100 provide interactive communications functionality via client subsystems 140. In some embodiments, certain functionality is provided in the context of communication sessions. For example, session streams may be used to manage large numbers of simultaneous communications transactions occurring over the communications network 300 (e.g., chat sessions, voice or video calls, messaging, content delivery, etc.). In some embodiments, these session streams are handled by the session management system 376.

Embodiments of the session management system 376 may manage session in various ways, depending on the type of session. For example, certain embodiments may manage and/or contribute to classifications of service flows as unicast, multicast, broadcast, simulcast, etc. As such, the session management system 376 may be configured to assign and manage session identifiers, handle session persistence, handle session protocol usage, etc. In some embodiments, the session management system 376 implements the Session Initiation Protocol (SIP) for some or all of the session streams. For example, SIP may be used by the session management system 376 as a signaling protocol, for handling multi-user communications, including streaming media, voice or video calls (e.g., voice over Internet protocol (VoIP) calls), instant messaging, real-time gaming, etc.

It will be appreciated that the network interface system 364, security system 368, authentication system 372, session management system 376, and/or other functional blocks of the provider network 160 may effectively provide various front-end types of functionality. For example, services delivered to the users may be provided by back-end systems, other content sources, etc. The front-end functional blocks described my, thus, effectively mediate provision of those services to users via their respective client subsystems 140.

As illustrated, back-end functionality may be provided by the back-end voice network 385, the back-end services framework 390, and the storage system 380. For example, voice calls and certain data flows may be handled by the back-end voice network 385. Embodiments of the back-end voice network 385 may include the plain old telephone service (POTS) network and/or other voice networks, such as packet-switched networks (e.g., via fiber-optic networks, DSL networks, etc.).

Embodiments of the back-end services framework 390 include and/or interface with all other service provision of the provider network 160. In some embodiments, the back-end services framework 390 provides integrated messaging functionality. For example, different types of messaging capabilities may be provided between user supersystems 100, between different client subsystems 140, from a user supersystem 100 to other user devices inside or outside of the user network 250, etc. The messaging functionality may include e-mail messaging, Short Message Service (SMS) messaging, video messaging, etc.

The back-end services framework 390 may also provide various cloud computing and/or content serving functionality. For example, in certain embodiments, the storage system 380 includes a storage area network (SAN) within the provider network 160. In other embodiments, the storage system 380 includes, or is in communication with, data storage (e.g., servers) over external networks. For example, the storage system 380 may include third-party storage offered over the Internet. The back-end services framework 390 may use the storage system 380 to provide functionality, including, for example, content mirroring, application serving, and cloud-based address books, photo albums, calendars, etc.

It will be appreciated that other functionality may be provided by embodiments of the back-end services framework 390 and/or other components of the provider network 160. Of course, much of the functionality described with reference to components of the provider network 160 may related to (e.g., rely on, be further integrated with, be enhanced by, etc.) components of the user supersystem 100. For the sake of additional clarity, embodiments of some functional components of illustrative base station systems 110 and client subsystems 140 are described with reference to FIGS. 4 and 5, respectively.

Figure 4:
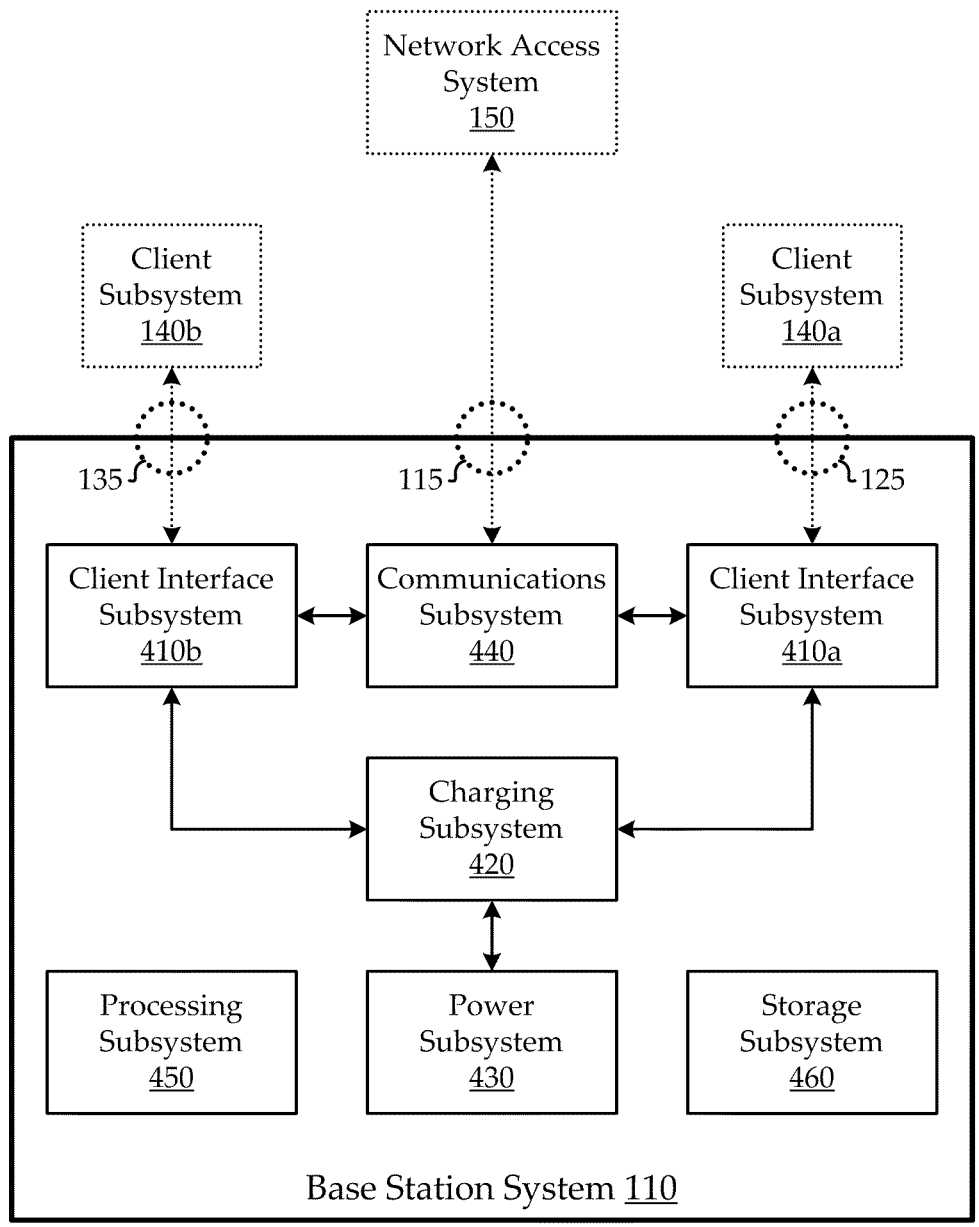
FIG. 4 shows a functional block diagram of a base station system in the context of certain other devices and systems, according to various embodiments.

FIG. 4 shows a functional block diagram of a base station system 110 in the context of certain other devices and systems, according to various embodiments. For example, embodiments of the base station system 110 may be implemented substantially as described with reference to FIG. 1A. For the sake of clarity and to add context to the description, the base station system 110 is shown in communication with a first client subsystem 140a, a second client subsystem 140b, and a network access system 150 via a tablet interface region 125, a handset interface region 135, and a network interface region 115, respectively. It will be appreciated from the descriptions above that many other arrangements are possible according to other embodiments. As such, the context should not be construed as limiting the scope of the embodiments.

Many functions of embodiments of the base station system 110 are provided by various functional blocks. As illustrated the functional blocks may include one or more client interface subsystems 410, a charging subsystem 420, a power subsystem 430, a communications subsystem 440, a processing subsystem 450, and a storage subsystem 560. For example, embodiments of the client interface subsystems 410 are configured to interface with one or more of the client subsystems 140, physically and/or logically.

In some embodiments, the client interface subsystems 410 of the base station system 110 include physical features for mounting one or both of the tablet system 120 and the handset system 130. For example, the client interface subsystems 410 include the tablet interface region 125 and handset interface region 135, configured to physically receive a portion of the tablet system 120 and handset system 130, respectively. In one embodiment, the physical receiving is used to provide docking functionality for one or more client subsystems 140.

In other embodiments, the client interface subsystems 410 include mounting features designed to removably couple the base station system 110 with the tablet system 120, for example, so that the otherwise portable tablet system 120 remains in place for certain uses. As one example, the tablet system 120 includes a touch screen for use in typing, drawing, dragging, and/or other types of user interactivity. Using the base station system 110 to secure the tablet system 120 while typing, etc. may improve the user experience.

In still other embodiments, the client interface subsystems 410 include feature that configure the base station system 110 as a special-purpose mount for interfacing the tablet system 120 and/or the handset system 130 with a fixture or other element. For example, embodiments of the base station system 110 may provide under-cabinet mounting functionality for use in a kitchen, so that the tablet system 120 can be swung down from under the kitchen cabinets when in use and swung out of the way otherwise.

In even other embodiments, the client interface subsystems 410 provide support for functionality of other components. For example, charging functionality of the charging subsystem 420 and/or communications functionality of the communications subsystem 440 may be implemented in part through features of the client interface subsystems 410.

Embodiments of the base station system 110 include the charging subsystem 420, configured to provide charging functionality for charging one or more client subsystems 140 or their associated devices (e.g., the tablet system 120 and/or the handset system 130 of FIG. 1A). In certain embodiments, the charging is contactless (e.g., by induction). In certain other embodiments, the charging functionality is provided by physical ports and/or cables configured to interface with cables and/or ports on the respective devices (e.g., the tablet system 120, handset system 130, etc.). These charging functions may use features of the client interface subsystems 410.

For example, in one embodiment, a handset system 130 in which one client subsystem 140b is implemented includes two conductive contacts and a magnetic element in proximity to the bottom of its chassis. The corresponding client interface subsystem 410b of the base station system 110 similarly includes two conductive contacts and a magnetic element as part of the handset interface region 135. When the handset system 130 is coupled with the base station system 110, the magnetic elements hold the handset system 130 in place while the conductive contacts facilitate the flow of charging current to the handset system 130, as managed by the charging subsystem 420. In some embodiments, the charging functionality of the charging subsystem 420 is enhanced in one or more ways. For example, the base station system 110 may provide functionality for charge monitoring, error detection, battery failure, quick charging, etc.

Of course, embodiments of the charging subsystem 420 may require a source of power from which to provide charging current. In some embodiments, the charging subsystem 420 is coupled with the power subsystem 430. Some embodiments of the power subsystem 430 may simply provide an interface between the base station system 110 and a power source (e.g., a wall outlet). Other embodiments of the power subsystem 430 include additional functionality. For example, the power subsystem 430 may process (e.g., clean, convert, regulate, step up or step down, etc.) the input power, monitor and/or regulate power consumption of the base station system 110 and/or other devices, provide different levels for different functions (e.g., provide constant output current to the charging subsystem 420, low-voltage output to internal circuitry of the base station system 110, regulated power to a cooling fan, etc.), etc.

As described above, some embodiments of the base station system 110 include the communications subsystem 440 for providing certain communications functionality. In various embodiments, the base station system 110 is configured (using functionality of the communications subsystem 440) to act as a wireless fidelity (Wi-Fi) hotspot, a wireless repeater, a network hub, a network router (e.g., with or without network address translation (NAT) functionality), a picocell or femtocell, etc. For example, as shown, the communications subsystem 440 may include the network interface region 115 for interfacing with the network access system 150.

In one embodiment, the network interface region 115 includes a physical port for plugging into a network (e.g., an Ethernet port). In another embodiment, the network interface region 115 includes an unwired (e.g., wireless, cellular, etc.) receiver for interfacing with a local network via the network access system 150. The network interface region 115 may also include one or more logical ports, antennae, and/or any other useful network interface component. In certain embodiments, the network access system 150 is implemented within a chassis of the base station system 110, such that connections with the network access system 150 are internal to the base station system 110, and may or may not include physical connections (e.g., the connections may be logical or functional connections between functional components or modules).

Certain embodiments of the communications subsystem 440 provide interactive communications functionality (e.g., from other devices, the user network, the provider network, and/or other networks) to the client subsystems 140. For example, the communications subsystem 440 may be coupled with the client interface subsystems 410 such that communications services may be provided via the tablet interface region 125 and the handset interface region 135. Alternately, the communications subsystem 440 may include additional transceivers, logical ports, etc. For example, embodiments of the communications subsystem 440 may include Bluetooth communications components, USB hubs, radio antennae, etc.

In various embodiments of the base station system 110, functionality of the various functional blocks is supported by one or more of the processing subsystem 450 and the storage subsystem 460. For example, embodiments of the processing subsystem 450 include a central processing unit and/or dedicated processors (e.g., communications processors, graphics processors, etc.). Embodiments of the storage subsystem 460 may include a hard disk drive, a flash drive, a micro server, a data processing engine, and/or any other useful storage and/or data management components.

It will be appreciated that various embodiments of the base station system 110 may include only some of the functional blocks shown in FIG. 4 and, accordingly, only some of the functionality described above. Further, in some embodiments, the functionality of the base station system 110 is integrated into a single chassis. In other embodiments, certain functionality may be offloaded to peripheral devices (e.g., a USB storage drive as part of the storage subsystem 460, or an external signal booster as part of the communications subsystem 440) or distributed among multiple components. In still other embodiments, the chassis of the base station system 110 includes additional or alternate features. For example, the chassis may include various device interfaces (e.g., recesses, locks, ports, plugs, etc.), controls (e.g., buttons, switches, etc.), physical features (e.g., cooling fins, rubberized feet, etc.), etc.

Figure 5:
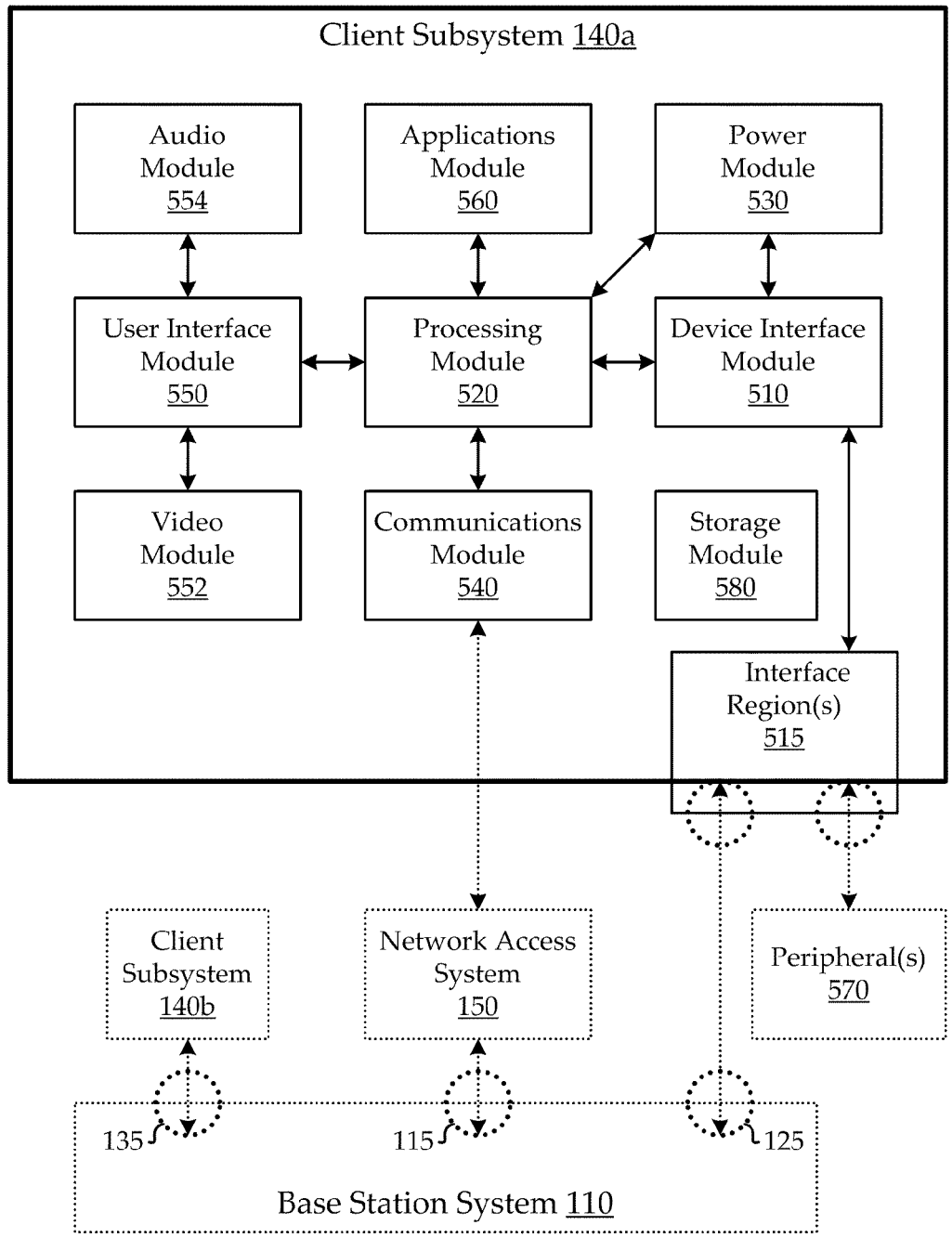
FIG. 5 shows a functional block diagram of a client subsystem in the context of certain other devices and systems, according to various embodiments.

It will be further appreciated that much of the functionality described above with reference to the base station system 110, and additional functionality of embodiments of user supersystems 100, may be implemented by the client subsystems 140. FIG. 5 shows a functional block diagram of a client subsystem 140*a* in the context of certain other devices and systems, according to various embodiments. For example, embodiments of the client subsystem 140*a* may be implemented substantially as described with reference to FIG. 1A. For the sake of clarity and to add context to the description, the client subsystem 140*a* is shown in communication with a network access system 150, a base station system 110 and one or more peripheral devices 570. The base station system 110 is shown in communication with the client subsystem 140*a*, another client subsystem 140*b*, and the network access system 150, via a tablet interface region 125, a handset interface region 135, and a network interface region 115, respectively.

It will be appreciated from the descriptions above that many other arrangements are possible according to other embodiments. As such, the context should not be construed as limiting the scope of the embodiments. For example, while the description will focus on client subsystem 140*a*, the same or different functional blocks may be included in client subsystem 140*b*. Notably, the client subsystem 140*a* is intended to broadly show illustrative functionality of a client subsystem 140, whether part of a dedicated device system (e.g., like the tablet system 120 or the handset system 130 of FIG. 1A), part of an undedicated device system (e.g., like the tablet system 120 or the handset system 130 of FIG. 1C), etc.

Embodiments of the client subsystem 140*a* may implement various functionality through functional blocks. As illustrated, the functional blocks may include a device interface module 510, one or more interface regions 515, a processing module 520, a power module 530, a communications module 540, a user interface module 550, a video module 552, an audio module 554, an applications module 560, and a storage module 580. As described above, embodiments of the client subsystem 140*a* may be incorporated within a device chassis.

Embodiments of the device interface module 510 are configured to provide an interface between the client subsystem 140 (e.g., or its respective device chassis) and either the base station system 110, a peripheral device 570, or some other device or component. For example, embodiments of the device interface module 510 may functionally correspond to embodiments of a client interface subsystem 410 of a base station system 110, as described with reference to FIG. 4.

In some embodiments, the device interface module 510 may be coupled with interface regions 515 that provide physical and/or logical components or features to support certain types of interfaces. For example, the interface regions 515 may include metal contacts (e.g., to facilitate charging from the base station system 110), a headphone or headset jack (e.g., for audio input/output), various internal ports or slots (e.g., for a battery, a memory card, a Subscriber Identity Module (SIM) card, etc.), etc. In one embodiment, the interface regions 515 include features for interfacing directly with the base station system 110 (e.g., via the tablet interface region 125 or the handset interface region 135). In another embodiment, the interface regions 515 include features for interfacing between the client subsystem 140*a* and another client subsystem 140 (e.g., between a handset system 130 and a tablet system 120). In yet another embodiment, the interface regions 515 are configured to support functionality of the communications module 540, as described more below.

Embodiments of the client subsystem 140*a* include a processing module 520. The processing module 520 may include a central processor, a graphics processor, an audio processor, and/or any other useful dedicated or multi-purpose processing components. For example, embodiments of the processing module 520 are designed to support functionality of other functional modules of the client subsystem 140*a*.

In some embodiments, the client subsystem 140*a* includes a power module 530. Embodiments of the power module 530 may deliver power to other functional modules, manage power consumption, process (e.g., clean, regulate, etc.) power, etc. Other functionality of the power module 530 may be appreciated in the context of other types of functionality.

For example, if an external active device is being used, the device may draw power from the client subsystem 140*a*, and that power delivery may be controlled by the power module 530. In another example, during a charging or discharging cycle of a battery, the power module 530 may control and/or monitor charging or discharging current.

Other embodiments of the client subsystem 140*a* include a communications module 540. Embodiments of the communications module 540 provide various types of communications functionality. For example, as illustrated, the communications module 540 may handle communications with the base station system 110 and/or the network access system 150. In some embodiments, the communications module 540 performs a number of client-side functions, such as handling of requests, messaging, communications sessions, proxy functions, etc. In certain embodiments, the communications module 540 uses functionality of the device interface module 510 and/or other functional modules, for example, to manage certain types of communication flows with certain types of other devices or systems (e.g., for protocol management, demodulation, etc.).

Still other embodiments of the client subsystem 140*a* include a user interface module 550. In some embodiments, the user interface module 550 handles inputs and outputs through the video module 552, the audio module 554, and/or the peripheral devices 570. For example, embodiments of the video module 552 include a camera and a display. The display may be active or passive; responsive to touch by a finger, stylus, or other implement; responsive to remote interactions, etc.

Embodiments of the camera include a digital video camera integrated within the chassis of the client subsystem 140*a*, such that it can be pointed in various directions. In one embodiment, the camera swivels to point either in a direction substantially normal to the display (e.g., typically toward the primary user of the tablet system 120) or in an opposite direction (e.g., typically away from the primary user of the tablet system 120). Video captured by the camera may also be displayed substantially in real time on the display. The camera may also be configured to take still images.

Embodiments of the audio module 554 may include audio input components (e.g., microphones) and audio output devices (e.g., speakers). Input and/or output functionality of the user interface module 550 may be further implemented through peripheral devices, such as peripheral cameras, keyboards, printers, scanners, sensors, etc. In certain embodiments, the client subsystem 140*a* is configured to interface with one or more input/output devices via the base station system 110. For example, the base station system 110 may include a USB hub or a Bluetooth receiver, by which the client subsystem 140*a* interfaces with a compatible keyboard. Other interactivity may also be provided by voice capture (e.g., audio-to-text translation, direct voice recording, etc.) through the audio module 554, by motion capture (e.g., gestures, etc.) through the video module 552, and/or in any other useful way.

It will be appreciated that much of the functionality of the various modules described above may be designed substantially to support delivery of certain applications to a user of the client subsystem 140*a*. Embodiments of the client subsystem 140*a* include an applications module 560 for handling applications through the client subsystem 140*a*. In various embodiments, the applications module 560 uses functionality of other modules, such as the user interface module 550, the processing module 520, and the communications module 540 to implement applications functions.

Applications delivery by the applications module 560 and/or other types of functionality of the client subsystem 140*a* may be further supported by local storage through the storage module 580. Embodiments of the storage module 580 may include disk drives, flash drives, and/or other data storage and processing components. In certain embodiments, the storage module 580 is configured to integrate functionally with external storage, for example, in the base station system 110 or in the "cloud" (e.g., offered via the Internet, the provider network, etc.).

It will be appreciated that, while many embodiments are described above with reference to a user supersystem 100 having two client subsystems 140 (e.g., in a tablet system 120 and a handheld system 130), other configurations and topologies are possible. In some embodiments, the user supersystem 100 includes one tablet system 120 and multiple handheld systems 130, for example, used throughout a home. In other embodiments, multiple tablet systems 120 are used as part of the user supersystem 100. In still other embodiments, other devices (e.g., in the home) include some or all of the functionality of the client subsystem 140 for operation as part of the user supersystem 100. For example, a client subsystem 140 may be implemented as part of an alarm clock, weather station, television set-top box, laptop computer, etc.

It will further be appreciated that various embodiments of client subsystems 140 may include only some of the functional blocks (or additional functional blocks to those) shown in FIG. 5. Accordingly, other embodiments may include only some of the functionality described above or different functionality from that described above. Further, it will be appreciated that some or all of the functionality of the client subsystems 140, and also some or all of the functionality of the base station system 110, may be implemented by a computational system. For example, dedicated and/or multi-purpose hardware and/or software may be used to implement many of the functions described with reference to FIGS. 4 and 5.

Figure 6:
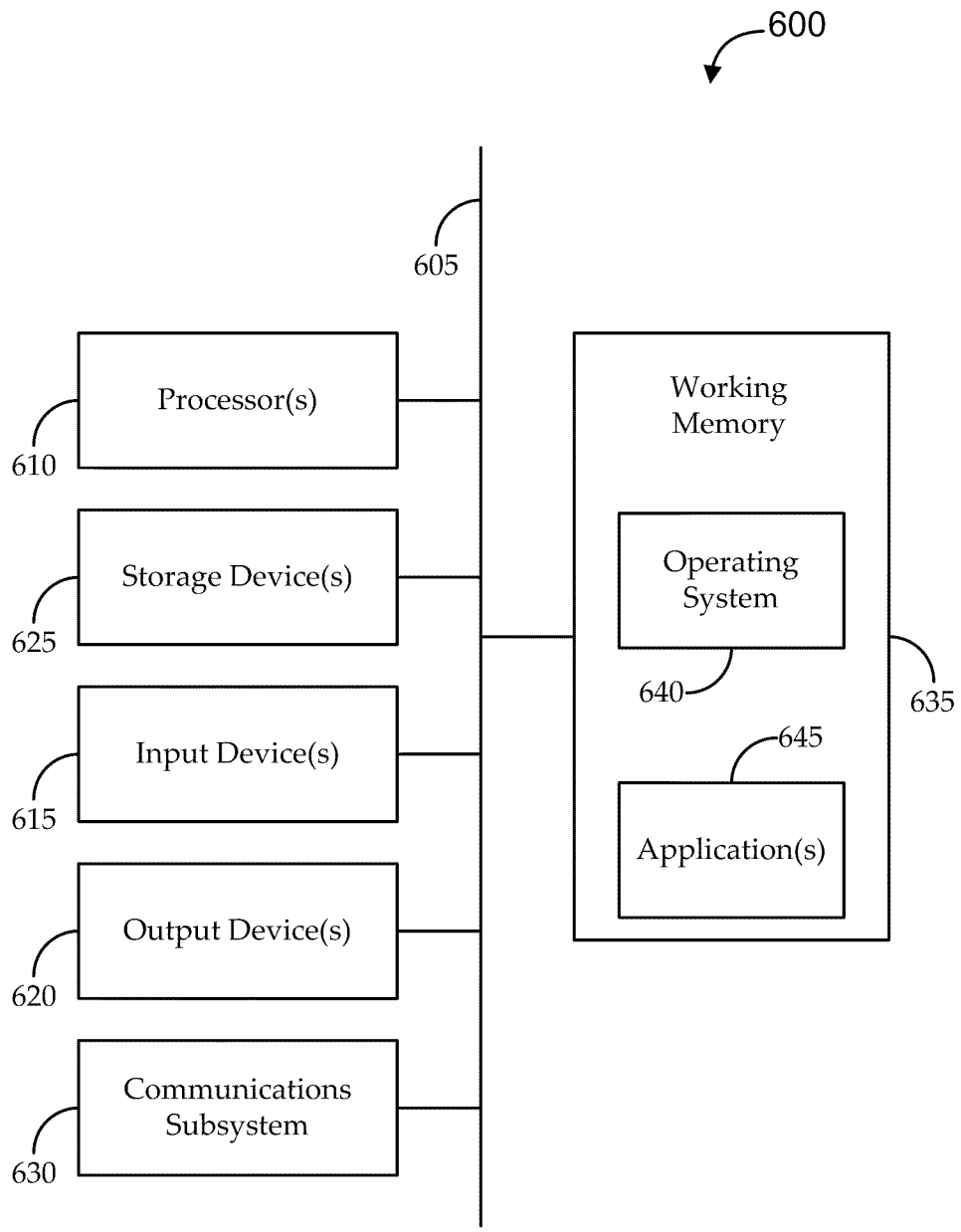
FIG. 6 shows a simplified block diagram of an illustrative computational system for use in implementing components of various embodiments.

FIG. 6 shows a simplified block diagram of an illustrative computational system 600 for use in implementing components of various embodiments. For example, components of the computational system 800 may be used to implement functionality of the base station system 110 or the client subsystem 140 (e.g., or the associated tablet system 120 or handset system 130). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computational system 600 is shown to include hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 602.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 600 to perform methods of the invention. According to a set of embodiments, some or all of the procedures of such methods are performed by the computational system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 600, various machine-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 600. The communications subsystem 630 (and/or components thereof) generally will receive the signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a storage device 625 either before or after execution by the processor(s) 610.

Multi-User Integrated Task List Embodiments

It will be appreciated from the above description that the systems, devices, and methods described above may be used to facilitate many different types of functionality. One type of functionality involves using the user supersystem 100 as a communications hub configured to provide a multi-user integrated task list. For example, the tablet system 120 may be used as a graphical communications hub in a family's home, used by the family to generate, view, and manage tasks for each member of the family and for the family as a unit.

As used herein, the term, "family" (also referred to as a "household"), is intended generally to describe any relatively small group of parties (e.g., individuals, groups, entities, etc.), who may or may not be directly related and who tend to share a space (or other close interests) and tend to communicate frequently about issues, including issues affecting the shared space. Similarly, the term, "home," as used herein, generally describes the shared space and/or close interests of the "family." In various embodiments, "contacts" may be stored for the family and/or for individual members of the family. Each "contact" may generally refer to a party (e.g., individual, entity, group, other family, other user supersystem 100, etc.) for which at least one member of the family has stored associated contact information.

Figure 7:
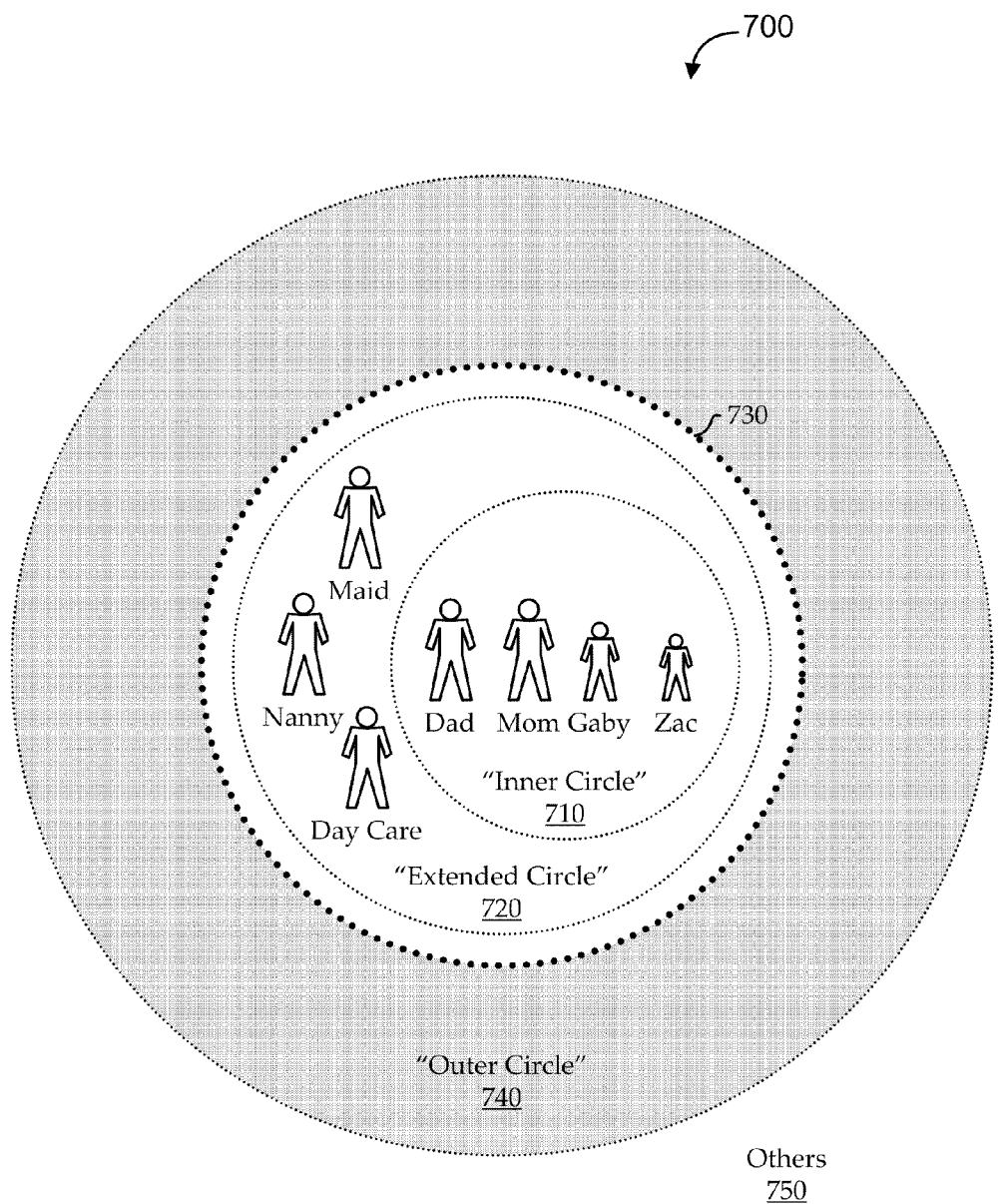
FIG. 7 illustrates an embodiment of a family communications environment, in accordance with various embodiments.

For the sake of clarity, FIG. 7 illustrates an embodiment of a family communications environment 700. In various embodiments, the family communications environment 700 includes one or more levels of family communications hierarchy. For example, as shown, the family communications environment 700 may include an "inner circle" 710, an "extended circle" 720, an "outer circle" 740, and "others" 750.

Typically, certain levels of the family communications hierarchy are considered to be "in the home," while others are considered to be "outside the home." These phrases are intended generally to refer to a party's relationship with the household, rather than with their actual location at any given point in time. An illustrative boundary between "outside the home" and "in the home" parties is shown as dashed region boundary 730.

For example, while it is not expected that any of the family members will spend all their time inside the home premises (e.g., or even a significant amount of time there), members of the family that live in the home and/or are directly impacted by home-related or family-related issues may be considered to be "in the home." These parties may be considered "in the home" family members, even when they are not, at a particular moment, physically inside or near the home. These "in the home" family members may, of course, communicate with many other parties, who may be considered "outside the home."

In one embodiment, the "family" is considered to include immediate family members living together in a single "home" (e.g., a house, apartment, etc.). As illustrated, this may include only the "inner circle" 710 of "Dad," "Mom," "Gaby," and "Zac." For example, the "inner circle" 710 may represent the group of parties typically affected by, and possibly participating in, family conversations.

In another embodiment, the family "inner circle" 710 is considered to include others. For example, it may be desirable to further include people who frequent the "home" into the "inner circle" 710 family conversations, like a nanny or caregiver, close relative or friend, maid, etc. Alternatively, it may be desirable to include certain parties in all family conversations as part of the "inner circle" 710, while including others in only a subset of those conversations as part of the "extended circle" 720. In some embodiments, "inner circle" 710 conversations and "extended circle" 720 conversations can separately be initiated, depending on the context of the conversation.

Notably, various types of conversations among family members (e.g., "inner circle" 710 and/or "extended circle" 720 members) may involve a communications hub in the home (e.g., the user supersystem 100) and one or more other devices. These other devices may include mobile devices, which may be located in or out of the home at any particular time. For example, some or all of the family members share the user supersystem 100 while at home, and some or all of the family members may also have individual devices, like cell phones, personal digital assistants (PDAs), etc. In some cases, each of the various devices may send and/or receive messages over different communications channels (e.g., communications networks, protocols, formats, etc.).

In some embodiments, rather than treating the "extended circle" 720 as part of the "family" and participating in certain family conversations, other techniques are used to contact those parties. For example, asynchronous group messaging may be used to contact all the affected parties as a group. Similarly, various types of communications may be used to contact parties considered to be part of the "outer circle" 740 or "others" 750. In certain embodiments, the "outer circle" 740 may include those parties that are in an address book associated with the user supersystem 100, otherwise approved via some technique by one or more members of the "inner circle" 710, etc.

Embodiments of the integrated task list may be used to coordinate tasks for individual members of the family and/or for the family as a unit, including the "inner circle" 710 members and/or "extended circle" 720 members. For example, Mom may wish to generate a task for Zac to clean his room in the next few days, for Gaby to write a thank you card for a present she received by the end of the week, a task for Dad to take out the trash tonight, a task for anyone (e.g., everyone) in the family to feed the dog every day, and a task for Nanny (the nanny) to try feeding Baby (the baby, who may not be included in the set of family members as unable to use the user supersystem 100 functionality) carrots at some point during the day. Each of these illustrative tasks has a different associated party, different types of due dates, etc. Of course, many other types of tasks are possible, as will be appreciated from the descriptions of other embodiments that follow.

Figure 8:
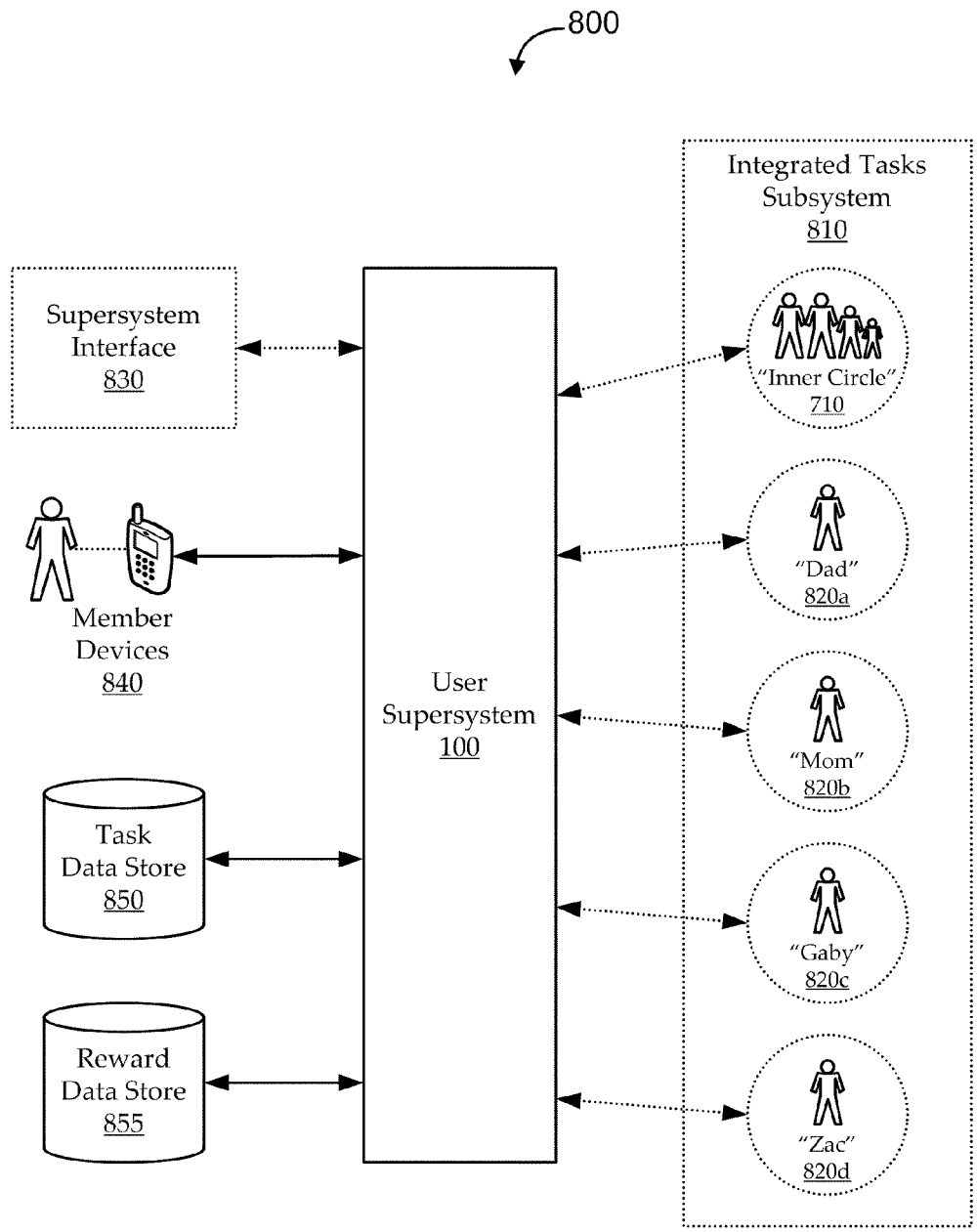
FIG. 8 shows a simplified block diagram of an illustrative communications system for providing task list functionality, according to various embodiments.

FIG. 8 shows a simplified block diagram of an illustrative communications system 800 for providing integrated task list functionality, according to various embodiments. The communications system 800 includes a user supersystem 100 in communication with one or more member devices 840, a task data store 850, and a reward data store 855. The user supersystem 100 is configured to interface locally with users through a supersystem interface 830 (e.g., a touch screen display and/or other integrated or peripheral interface device).

The user supersystem 100 is further configured to provide integrated task list functionality through an integrated tasks subsystem 810. The integrated tasks subsystem 810 may coordinate tasks for the entire family (e.g., shown as the "inner circle" 710) and for each family member 820 (e.g., shown as "Dad" 820a, "Mom" 820b, "Gaby" 820c, and "Zac" 820d). In some embodiments, the family may include an extended family group, for example, the "extended circle" 720 members. In certain of those embodiments, tasks may be managed by the integrated tasks subsystem 810 for individual members of the extended family group.

It will be appreciated that the system 800 may be used to handle many different tasks for the family. As used herein, "tasks" are intended to broadly include any non-urgent, asynchronous type of messaging for the family. For example, tasks may include notes (e.g., "See you at 6"), one-time to-do items (e.g., "Remember to pick up your brother this afternoon"), recurring to-do items (e.g., "Trash Night"), etc. In typical scenarios, tasks may relate to "don't forget" types of items (e.g., whether or not a particular date or time is involved), rather than informative notes. For example, an informative message, such as "Great job on your report, Zac!", may be communicated as a task; but is more likely to be communicated using other messaging functionality.

Suppose Mom wants to let Zac know that his dinner is in the refrigerator in a container with a blue lid. Mom accesses a task application, facilitated by the integrated tasks subsystem 810, through the supersystem interface 830 of a component of the user supersystem 100 (e.g., the tablet system 120). Alternately, Mom may access the task application through her member device 840, which may be configured to interface with the user supersystem 100 (e.g., through standard messaging functionality, through a dedicated application loaded on the member device 840, etc.).

Mom may then create a task. For example, she may include text (e.g., "Zac, dinner is in the fridge"), images (e.g., a picture of the refrigerator with the door open and an arrow pointing to the blue-lidded container inside), voice, etc. The task may then be assigned (e.g., tagged) for Zac, causing the task to be associated with "Zac" 820*d* in the integrated tasks subsystem 810. The task may also be saved in the task data store 850, along with other tasks assigned to "Zac" 820*d* and other family members 820 or to the entire family group. Thus, the system can including functionality for storing a multi-user task list in the data store.

In some embodiments, one or more rewards may be associated with the task, and related data may be stored in the reward data store 855. For example, Gaby is assigned a task to clean her room, which carries a reward for completion of the task. When Gaby indicates to the user supersystem 100 that she has completed the task (e.g., and/or when completion of the task is verified by a parent, the assignor, etc.), the reward may be provided and/or revealed.

Of course, many types of rewards are possible. In some embodiments, rewards are hidden until completion of the task, at which point, they are revealed. In other embodiments, the rewards are displayed along with the task, for example, as an enticement to complete the task.

Some embodiments of rewards include goods or services, such as e-tickets (e.g., to movies, events, etc.), coupons (e.g., "one free ice cream," "Mom and Dad will pay for half of your prom dress," etc.), dispensations (e.g., "one week of no dishwashing duty," etc.), privileges (e.g., "one hour of video games tonight," "50 extra cell phone minutes for the month," etc.), etc. Other embodiments of rewards include cumulative units, such as points, stars, dollars, etc. For example, each task may be associated with a number of points, and certain rewards are available after a certain number of points are accumulated.

In some embodiments, the reward data store 855 is configured to store reward text and/or associated media (e.g., images, audio, etc.). In other embodiments, the reward data store 855 is configured to store accumulated reward points. In still other embodiments, the reward data store 855 is configured to facilitate delivery of or access to rewards. For example, certain rewards may be available online (e.g., a credit to a prepaid account, such as a virtual gift card for redemption at an e-commerce location; a credit, such as an automatic deposit, electronic funds transfer, etc. to a bank account associated with the person to whom the task is assigned; and/or the like), may relate to services offered through the user supersystem 100 or the communications services provider (e.g., extra cell phone minutes, IPTV minutes, on-demand programming, etc.), etc.

Other embodiments of the integrated tasks subsystem 810 provide additional functionality. In some embodiments, one or more auditors may be assigned to a task. For example, the family member that assigned the task, a default member (e.g., Mom), or a selected member may be assigned as able to verify the completion of a task, either locally (e.g., through the supersystem interface 830) or remotely (e.g., through one or more member devices 840). In other embodiments, delivery options may be associated with the task. For example, the creator of a task may choose to have the task displayed prominently on a main dashboard page of the user supersystem 100, displayed on a cumulative task page for the family, displayed on a task page for the assigned family member(s) 820, sent via one or more messaging modes to one or more member devices 840 associated with the family member(s) 820 assigned to the task, etc.

Figure 9:
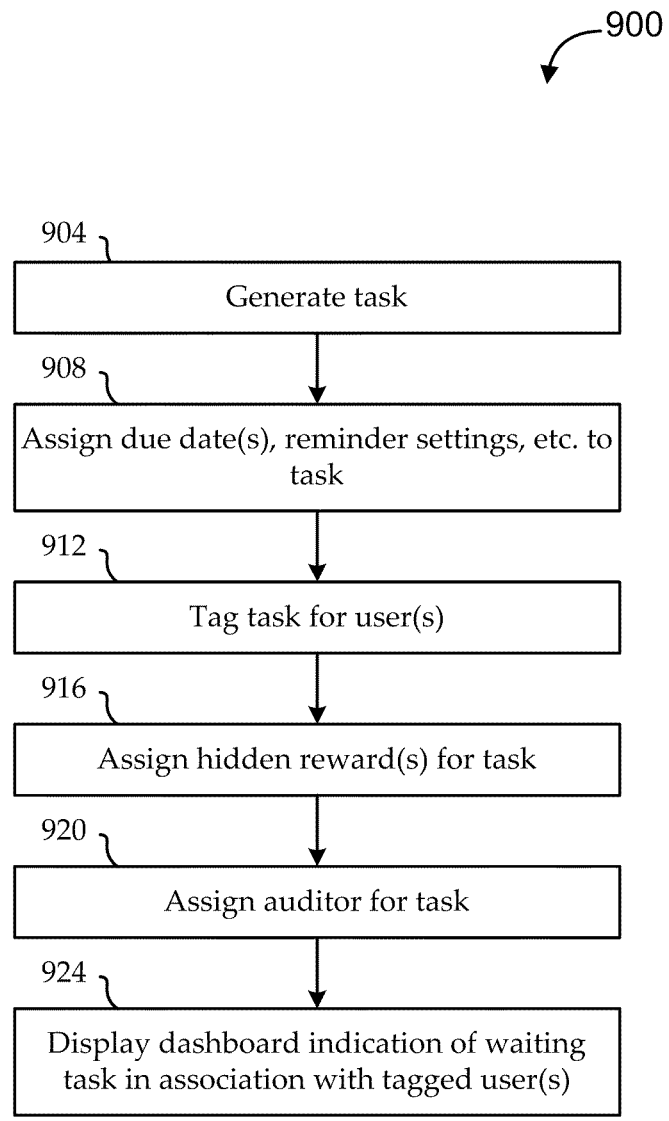
FIG. 9 shows a block diagram of an illustrative method for handling a task in an integrated task list environment, according to various embodiments.

FIG. 9 shows a flow diagram of an illustrative method 900 for handling a task in an integrated task list environment, according to various embodiments. The method 900 begins at block 904 when a new task is generated. As described above, according to various embodiments, the task may be generated local to the user supersystem 100 (e.g., via the supersystem interface 830) and/or remotely (e.g., via one or more member devices 840). For example, a task list application may be accessed, as facilitated by an integrated tasks subsystem 810, through which a new task control (e.g., a soft button) may be available for adding a new task. It will be appreciated that similar or substantially identical functionality may be available when editing an existing task.

At block 908, various task properties may be assigned, including one or more due dates, reminder settings, expiration dates, etc. In some embodiments, task deadlines or due dates are implied by the task, and may not be explicitly assigned. For example, the task "please pick up Zac today from school" may implicitly expire after it is time to pick up Zac from school that day.

It may be inconvenient, in some cases, to force a user to add a due date or expiration date to a task. As such, some embodiments include default properties, task wizards, task templates, etc. For example, an option may be provided for adding a "daily task." When adding a task as a "daily task," the task may be automatically set to expire (e.g., be removed from the task display and/or from the task data store 850) at the end of the day (e.g., or 24 hours later, etc.). In other embodiments, the integrated tasks subsystem 810 includes functionality to interpret task content and guess appropriate properties. For example, a task reading "Take out the trash tonight" may be parsed to find the term "tonight," from which the integrated tasks subsystem 810 may determine that the task should expire automatically (e.g., or prompt the user to set the task to expire) at midnight.

Some embodiments permit multiple due dates, reminders, expiration dates, etc. to be assigned to one task. For example, it may be desirable for a task (e.g., "Clean your room by Friday") to carry a single due date and associated single expiration date, but daily reminders. For other tasks (e.g., "Feed the cat"), it may be desirable to carry a recurring due date, no expiration date, and no reminders. Related functionality may also be provided. For example, some embodiments provide "snooze," "keep task alive," or similar functionality for moving the due date, expiration date, reminder date, etc. (e.g., when authorized to do so). Other embodiments offer escalating reminders. For example, a first reminder may be displayed in the assigned family member's 820 task page, a second reminder may be sent via messaging to the assigned family member's 820 member device 840, and a third reminder may flash on the family's main dashboard page.

Before or after assigning task settings at block 908, the task may be assigned to one or more users at block 912. As described above, the task may be assigned to one family member 820, to multiple designated family members 820, to a predetermined group of family members 820 (e.g., the "inner circle" 710, where the family group is extended), to the entire family group, etc. In some embodiments, the task is assigned by entering or selecting users as part of the integrated tasks subsystem 810 interface. In other embodiments, other assignment options are available. For example, a task may be generated in block 904 in such a way as to designate assignment to a certain user or users (e.g., the task application is initiated by selecting an icon associated with a particular user or user group), the task may be dragged and dropped onto a user icon, the task may be auto-assigned according to task content (e.g., first audio or text in the task message indicates the desired user for assignment, for example "Zac: . . . "), etc.

In some embodiments, a reward (e.g., a hidden reward) is assigned for the task at block 916. Illustrative types of rewards and reward assignments are described above with reference to FIG. 8. Also, in some embodiments, one or more auditors are assigned to the task at block 920. The auditor(s) may be selected for various purposes including, for example, to verify completion of tasks, to release rewards, to override or change task settings, etc.

In some embodiments, the method 900 includes notifying one or more users of the new task. Such notifications can be provided to one or more users to whom the task is assigned, one or more users designated as task auditors, and/or like. Such notifications can occur, as described below, at the time the task is created and/or assigned, at the time a user indicates that the task has been completed, and/or at the time an auditor confirms that the task has been completed, and/or when a reward is provided for completion of the task, to name but a few examples.

Thus, for instance, at block 924, an indication of the generated task is displayed, as appropriate, e.g., to notify a user that the task has been assigned to that user. In one embodiment, a main dashboard displayed on the tablet system 120 of the user supersystem 100 shows icons for each family member 820 with an indication of any associated tasks. For example, an icon associated with a family member 820 may have a number in a corner of the icon corresponding to the number of tasks waiting for completion by that family member 820. In other embodiments, displaying an indication of the task includes formatting the task data for display on the family member's 820 task page, for sending via messaging to the assigned family member 820 (e.g., and/or to other family members 820), etc.

Figure 10:
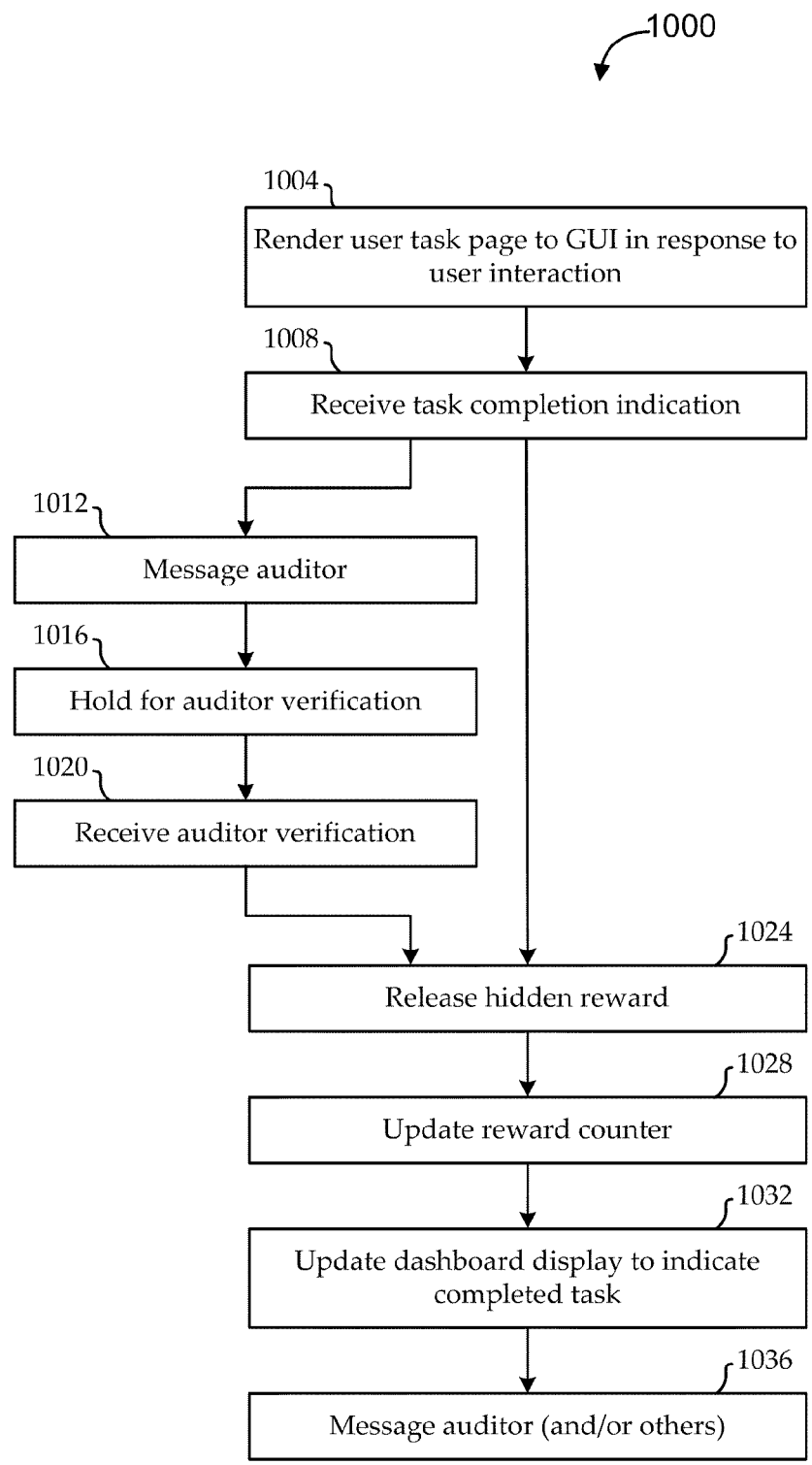
FIG. 10 shows a flow diagram of an illustrative method for accessing an assigned task, according to various embodiments.

FIG. 10 shows a flow diagram of an illustrative method 1000 for accessing an assigned task, according to various embodiments. In some embodiments, the task being accessed via the method 1000 was generated via an embodiment of the method 900 of FIG. 9. The method 1000 begins at block 1004 by rendering a user task page to a graphical interface in response to a user interaction. For example, a graphical interface corresponding to a family member's 820 task page is displayed to the tablet system 120 display when the family member selects his icon on the main dashboard screen, or accesses a tasks page associated with the family.

Figure 11:
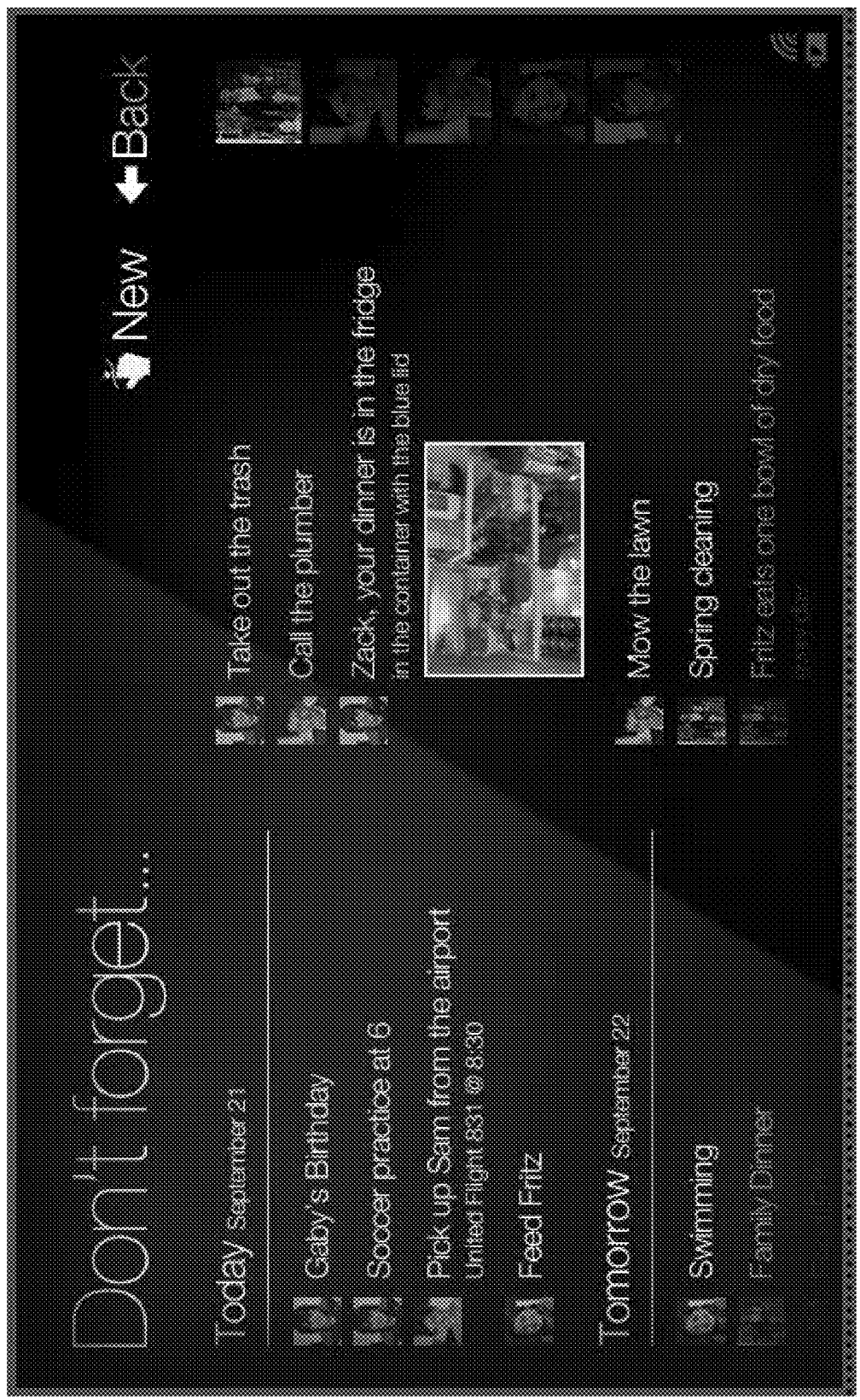
FIGS. 11 and 12 are exemplary screen shots showing examples of user interfaces that may be presented to a user, in accordance with various embodiments.

For the sake of illustration, FIG. 11 shows a screenshot of a tasks page for the family that may be displayed, for example, to the tablet system 120 according to block 1004 of the method 1000. As shown, the tasks page may categorize and/or identify tasks in various ways. For example, tasks assigned to a specific due date are listed in one region of the tasks page, while tasks carrying no due date (e.g., or a recurring due date) are listed in another region. Tasks are also sorted so that the most urgent tasks, tasks with closest due dates, tasks with most escalated reminder status, most recently added tasks, etc. are listed first. Notably, tasks may be associated with text and/or other media.

It will be appreciated that the task page shown in FIG. 11 lists all tasks associated with the family and all family members 820. In some embodiments, tasks may be sorted and/or filtered for particular family members 820. For example, as illustrated, a set of icons may be displayed on the right-hand side of the task screen. Selecting one of the icons may filter the task screen to show only tasks associated with the family member 820 corresponding to the selected icon.

Figure 12:
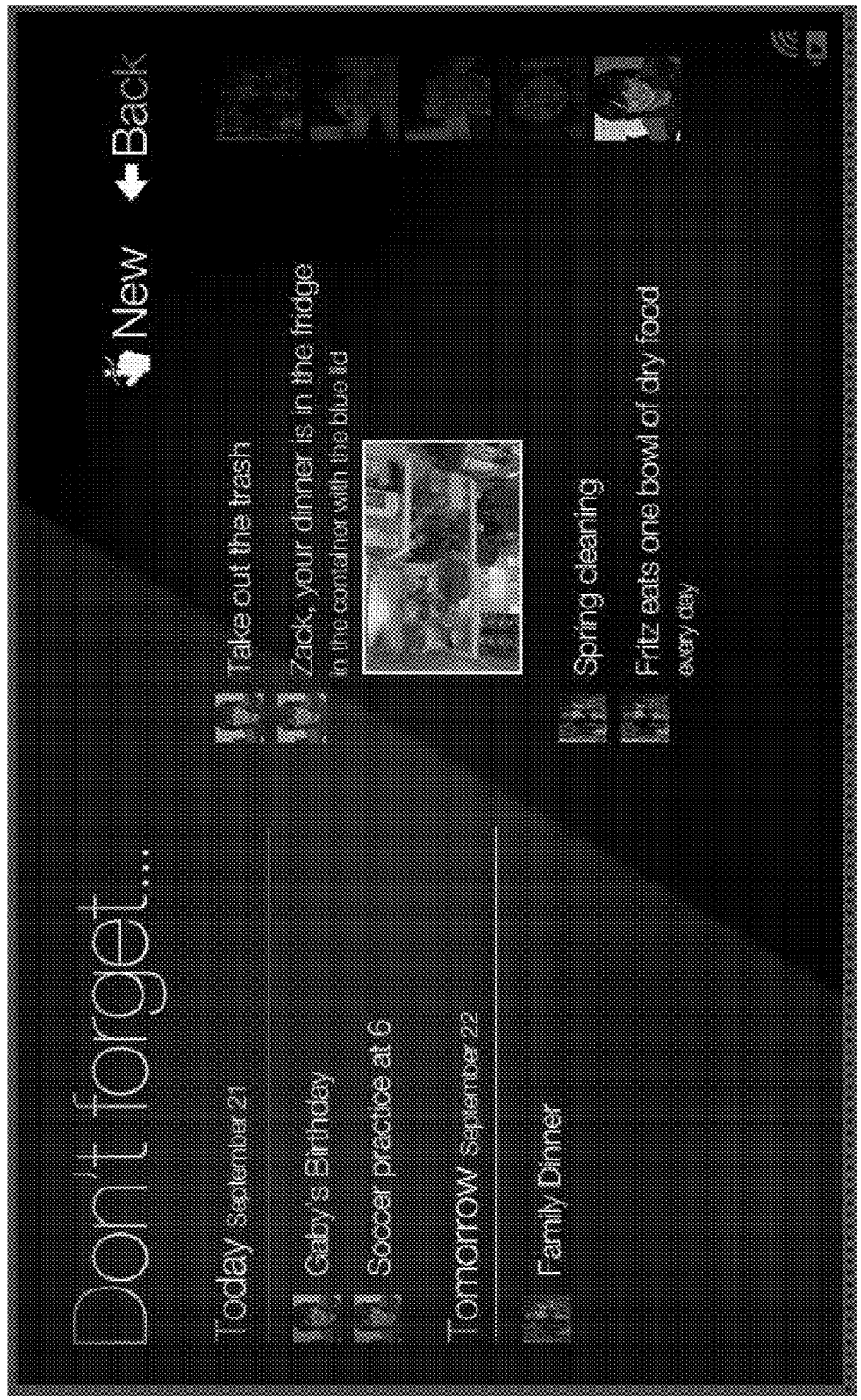

For example, suppose (e.g., according to block 1004 of the method 1000 of FIG. 10) that Zac selects his icon. The screen may change to look similar to the illustrative screenshot shown in FIG. 12. As illustrated in FIG. 12, the task screen shows only tasks specifically assigned to Zac and tasks assigned any user group or family group to which Zac belongs.

Returning to FIG. 10, at block 1008, a task completion indication may be received. For example, Zac may select one of his tasks in the task screen of FIG. 12. An interface may then be provided with one or more options, including marking the task as complete.

In some embodiments, a message auditor assigned to the task (e.g., in block 920 of the method 900 of FIG. 9) is notified and/or contacted (e.g., via text message or email) to ask for verification at block 1012. Completion of the task may be held at block 1016 until authorization is received at block 1020. Upon task completion at block 1008, or upon receipt of verification from the auditor at block 1020, a reward associated with the task may be released at block 1024 (and/or one or more users may be notified of the reward, as appropriate). As described above, releasing the reward at block 1024 may include revealing a hidden reward or providing access to a reward. In some embodiments (e.g., where the reward includes redeemable points or similar enticements), a reward counter is updated to reflect the associated reward at block 1028.

At block 1032, when the task has been completed, one or more indications may be updated (and/or notifications provided) accordingly. For example, a dashboard screen icon associated with the assigned family member 820 has a number in a corner of the icon corresponding to the number of tasks waiting for completion by that family member 820, and the number is decremented (e.g., or removed) to reflect the task completion. The task may also be removed or marked as complete on one or more screens. In some embodiments, at block 1036, the auditor and/or others are notified (e.g., messaged) to indicate that the task has been completed, that completion has been verified, that a reward has been released, etc.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise.

What is claimed is:

1. A communication system for providing a household task list, the system comprising:
   a computing device, comprising at least one processor and at least one computer readable storage medium in communication with the at least one processor, the at least one computer readable storage medium having encoded thereon a set of instructions that are executable by the processor to cause the computer system to perform one or more operations, the set of instructions comprising:
   instructions for storing, in a data store, a multi-user task list comprising a plurality of tasks, each task being assigned to one or more users;
   instructions for generating a new task to add to the multi-user task list;
   instructions for parsing a plain text sentence description of the new task content to determine when the new task is due, by inferring a due date only from a context of the plain text sentence description of the new task content;
   instructions for parsing the plain text sentence description of the new task content to determine and assign one or more users of the new task, by inferring the one or more users only from the context of the plain text sentence description of the new task content;
   instructions for assigning one or more task properties to the new task, the one or more task properties comprising the due date, the one or more users, and one or more other task properties, wherein the one or more other task properties comprise at least one of a reminder setting, one or more task auditors, or one or more hidden rewards associated with completion of the new task, and wherein the one or more task auditors are responsible for determining whether the new task has been completed or not;
   instructions for notifying the one or more users assigned to the new task, by transmitting a notification to one or more mobile devices associated with the one or more users;
   instructions for sending a reminder to the one or more users to complete the new task to a standard first user device;
   instructions for sending, based on a determination that the new task has not been completed by the one or more users, a second reminder to the one or more users to complete the new task, wherein the second reminder is sent to a second user device that is most likely to capture the attention of the one or more users;
   instructions for receiving an indication that the new task has been completed by the one or more users;
   instructions for determining and verifying whether the new task has been completed by the one or more users, wherein the instructions for determining and verifying whether the new task has been completed by the one or more users comprise instructions for notifying the one or more task auditors of the indication that the new task has been completed and instructions for receiving, from the one or more task auditors, confirmation that the new task has been completed;
   instructions for updating a record of the new task in the data store to indicate that the new task has been completed by the one or more users, wherein the instructions for updating the record of the new task in the data store to indicate that the new task has been completed by the one or more users comprise instructions for updating a record of the new task in the data store only upon receiving, from the one or more task auditors, the confirmation that the new task has been completed;
   instructions for notifying the one or more users that the new task has been completed, which has been verified and confirmed by the one or more task auditors and the record of the new task has been updated in the data store, by updating a dashboard screen icon, associated with each of the one or more users to whom the new task has been assigned, to decrement a number on the dashboard screen icon, the number indicating tasks waiting for completion by each of the one or more users; and
   instructions for providing a reward to the one or more users that have completed the new task, wherein at least one of an existence of the reward or a nature of the reward is hidden until the new task has been verified and confirmed as being completed, and wherein a reward counter is updated on the dashboard screen for each of the one or more users.

2. The system of claim 1, wherein the computing device is part of a supersystem for providing interactive communications services within a local network, the supersystem comprising:
   a tablet system, comprising a first client subsystem of the local network and a first user interface module configured to provide interactivity with first communications services provided by the first client subsystem;
   a handset system, comprising a second client subsystem of the local network and a second user interface module configured to provide interactivity with second communications services provided by the second client subsystem; and
   a base station system, comprising:
      a first interface subsystem configured to communicatively and removably couple the base station with the tablet system;
      a second interface subsystem configured to communicatively and removably couple the base station with the handset system; and
      a communications subsystem configured to communicatively couple the base station with the local area network such that at least a portion of the first and second communications services are provided via the base station.

3. The system of claim 2, wherein the base station system comprises the computing device.

4. The system of claim 2, wherein the tablet system comprises the computing device.

5. The system of claim 1, wherein the at least one computer readable storage medium comprises the data store.

6. The system of claim 1, wherein the computing device is a household communication hub comprising a display device and an input device.

7. The system of claim 6, wherein the display device comprises a touchscreen that serves as the input device.

8. The system of claim 6, wherein the instructions for generating a new task comprise instructions for receiving, via the input device, user input pertaining to the new task.

9. The system of claim 6, wherein the instructions for generating a new task comprise instructions for receiving, from a mobile device in communication with the computing device, user input pertaining to the new task.

10. The system of claim 6, wherein the instructions for notifying one or more users of the new task comprise instructions for displaying an indication of the new task on the display device.

11. The system of claim 10, wherein the instructions for displaying an indication of the new task comprise instructions for displaying a list of at least a portion of the plurality of tasks, the at least a portion of the plurality of tasks comprising the new task.

12. The system of claim 11, wherein the instructions for displaying an indication of the new task further comprise filtering the plurality of tasks according to the one or more users to which each of the plurality of tasks is assigned.

13. The system of claim 6, wherein each of the one or more mobile devices execute a household communication application that interacts with the household communication hub, and wherein the notification comprises a notification delivered with the household communication application.

14. The system of claim 1, wherein the notification comprises one or more of a voice message, a text message, an email message, or an image.

15. The system of claim 1, wherein the one or more task properties include a set of one or more users to whom the task is assigned, and wherein the instructions for notifying one or more users comprise instructions for notifying the set of one or more users to whom the task is assigned.

16. The system of claim 1, wherein the reward comprises a credit to an account separate from the communication system.

17. The system of claim 16, wherein the account is an account at a financial institution.

18. The system of claim 16, wherein the account is a prepaid account at an electronic commerce provider.

19. An apparatus, comprising:
a non-transitory computer readable medium having encoded thereon a set of instructions executable by one or more computers to perform one or more operations for providing a household task list, the set of instructions comprising:
instructions for maintaining, in a data store, a multi-user task list comprising a plurality of tasks, each task being assigned to one or more users;
instructions for generating a new task to add to the multi-user task list;
instructions for parsing a plain text sentence description of the new task content to determine when the new task is due, by inferring a due date only from a context of the plain text sentence description of the new task content;
instructions for parsing the plain text sentence description of the new task content to determine and assign one or more users of the new task, by inferring the one or more users only from the context of the plain text sentence description of the new task content;
instructions for assigning one or more task properties to the new task, the one or more task properties comprising the due date, the one or more users, and one or more other task properties, wherein the one or more other task properties comprise at least one of a reminder setting, one or more task auditors, or one or more hidden rewards associated with completion of the new task, and wherein the one or more task auditors are responsible for determining whether the new task has been completed or not;
instructions for notifying the one or more users assigned to the new task, by transmitting a notification to one or more mobile devices associated with the one or more users;
instructions for sending a reminder to the one or more users to complete the new task to a standard first user device;
instructions for sending, based on a determination that the new task has not been completed by the one or more users, a second reminder to the one or more users to complete the new task, wherein the second reminder is sent to a second user device that is most likely to capture the attention of the one or more users;
instructions for receiving an indication that the new task has been completed by the one or more users;
instructions for determining and verifying whether the new task has been completed by the one or more users, wherein the instructions for determining and verifying whether the new task has been completed by the one or more users comprise instructions for notifying the one or more task auditors of the indication that the new task has been completed and instructions for receiving, from the one or more task auditors, confirmation that the new task has been completed;
instructions for updating a record of the new task in the data store to indicate that the new task has been completed by the one or more users, wherein the instructions for updating the record of the new task in the data store to indicate that the new task has been completed by the one or more users comprise instructions for updating a record of the new task in the data store only upon receiving, from the one or more task auditors, the confirmation that the new task has been completed;
instructions for notifying the one or more users that the new task has been completed, which has been verified and confirmed by the one or more task auditors and the record of the new task has been updated in the data store, by updating a dashboard screen icon, associated with each of the one or more users to whom the new task has been assigned, to decrement a number on the dashboard screen icon, the number indicating tasks waiting for completion by each of the one or more users; and
instructions for providing a reward to the one or more users that have completed the new task, wherein at least one of an existence of the reward or a nature of the reward is hidden until the new task has been verified and confirmed as being completed, and wherein a reward counter is updated on the dashboard screen for each of the one or more users.

20. A method of providing a household task list, the method comprising:
maintaining, in a data store, a multi-user task list comprising a plurality of tasks, each task being assigned to one or more users;
generating, with a computer, a new task to add to the multi-user task list;
parsing a plain text sentence description of the new task content to determine when the new task is due, by inferring a due date only from a context of the plain text sentence description of the new task content;
parsing the plain text sentence description of the new task content to determine and assign one or more users of the new task, by inferring the one or more users only from the context of the plain text sentence description of the new task content;
assigning, with the computer, one or more task properties to the new task, the one or more task properties comprising the due date, the one or more users, and one or more other task properties, wherein the one or more other task properties comprise at least one of a reminder setting, one or more task auditors, or one or more hidden rewards associated with completion of the new task, and wherein the one or more task auditors are responsible for determining whether the new task has been completed or not;

notifying, with the computer, the one or more users assigned to the new task, by transmitting a notification to one or more mobile devices associated with the one or more users;

sending a reminder to the one or more users to complete the new task to a standard first user device;

sending, based on a determination that the new task has not been completed by the one or more users, a second reminder to the one or more users to complete the new task, wherein the second reminder is sent to a second user device that is most likely to capture the attention of the one or more users;

receiving an indication that the new task has been completed by the one or more users;

determining and verifying whether the new task has been completed by the one or more users, wherein determining and verifying whether the new task has been completed by the one or more users comprises notifying the one or more task auditors of the indication that the new task has been completed, and receiving, from the one or more task auditors, confirmation that the new task has been completed;

updating a record of the new task in the data store to indicate that the new task has been completed by the one or more users, wherein updating the record of the new task in the data store to indicate that the new task has been completed by the one or more users comprises updating a record of the new task in the data store only upon receiving, from the one or more task auditors, the confirmation that the new task has been completed;

notifying the one or more users that the new task has been completed, which has been verified and confirmed by the one or more task auditors and the record of the new task has been updated in the data store, by updating a dashboard screen icon, associated with each of the one or more users to whom the new task has been assigned, to decrement a number on the dashboard screen icon, the number indicating tasks waiting for completion by each of the one or more users; and providing a reward to the one or more users that have completed the new task, wherein at least one of an existence of the reward or a nature of the reward is hidden until the new task has been verified and confirmed as being completed, and wherein a reward counter is updated on the dashboard screen for each of the one or more users.

\* \* \* \* \*